(12) United States Patent
Henry

(10) Patent No.: US 11,687,465 B2
(45) Date of Patent: Jun. 27, 2023

(54) SPATIAL CACHE

(71) Applicant: IDEX Biometrics ASA, Oslo (NO)

(72) Inventor: Matthew Henry, Elkridge, MD (US)

(73) Assignee: IDEX Biometrics ASA, Oslo (NO)

( * ) Notice: Subject to any disclaimer, the term of this patent is extended or adjusted under 35 U.S.C. 154(b) by 0 days.

(21) Appl. No.: 16/910,813

(22) Filed: Jun. 24, 2020

(65) Prior Publication Data

US 2021/0406197 A1 Dec. 30, 2021

(51) Int. Cl.
| | | |
|---|---|---|
| *G06F 12/1045* | (2016.01) |
| *G06F 9/30* | (2018.01) |
| *G06F 12/02* | (2006.01) |
| *G06F 12/06* | (2006.01) |
| *G06F 12/0884* | (2016.01) |
| *G06F 12/109* | (2016.01) |

(52) U.S. Cl.
CPC ...... *G06F 12/1063* (2013.01); *G06F 9/30043* (2013.01); *G06F 12/0207* (2013.01); *G06F 12/0653* (2013.01); *G06F 12/0884* (2013.01); *G06F 12/109* (2013.01)

(58) Field of Classification Search
CPC ............ G06F 9/30043; G06F 12/0207; G06F 12/0653; G06F 12/0884; G06F 12/0893; G06F 12/1063; G06F 12/109
See application file for complete search history.

(56) References Cited

U.S. PATENT DOCUMENTS

2019/0043553 A1* 2/2019 Chang ................. G06F 3/0659
2019/0295631 A1* 9/2019 Yadavalli .............. G11C 11/418

OTHER PUBLICATIONS

Li Shuo et al., "RC-NVM Dual-Addressing Non-Volatile Memory Architecture Supporting Both Row and Column Memory Accesses", Feb. 2019, IEEE, vol. 68 No. 2, pp. 239-254 (Year: 2019).*
International Preliminary Report on Patentability with Transmittal dated Jan. 5, 2023 in related International Application No. PCT/IB2021/055185 (7 pages).
International Search Report and Written Opinion with Transmittal dated Sep. 28, 2021 in related International Application No. PCT/IB2021/055185 (12 pages).

* cited by examiner

*Primary Examiner* — Aracelis Ruiz
(74) *Attorney, Agent, or Firm* — Rothwell, Figg, Ernst & Manbeck, P.C.

(57) ABSTRACT

A cache includes a p-by-q array of memory units; a row addressing unit; and a column addressing unit. Each memory unit has an m-by-n array of memory cells. The column addressing unit has, for each memory unit, m n-to-one multiplexers, one associated with each of the m rows of the memory unit, wherein each n-to-one multiplexer has an input coupled to each of the n memory cells associated with the row associated with that multiplexer. The row addressing unit has, for each memory unit, n m-to-one multiplexers, one associated with each of the n columns of the memory unit, wherein each m-to-one multiplexer has an input coupled to each of the m memory cells associated with the column associated with that multiplexer. The row addressing unit and column addressing unit support reading and/or writing of the array of memory units, e.g. using virtual or physical addresses.

24 Claims, 14 Drawing Sheets

| 13,2 | 13,3 | 13,4 | 13,5 | 13,6 | 13,7 | 13,8 | 13,9 |
|------|------|------|------|------|------|------|------|
| 12,2 | 12,3 | 12,4 | 12,5 | 12,6 | 12,7 | 12,8 | 12,9 |
| 11,2 | 11,3 | 11,4 | 11,5 | 11,6 | 11,7 | 11,8 | 11,9 |
| 10,2 | 10,3 | 10,4 | 10,5 | 10,6 | 10,7 | 10,8 | 10,9 |
| 9,2  | 9,3  | 9,4  | 9,5  | 9,6  | 9,7  | 9,8  | 9,9  |
| 8,2  | 8,3  | 8,4  | 8,5  | 8,6  | 8,7  | 8,8  | 8,9  |
| scratchpad space | | | | | | | |

FIG. 11

| 13,2 | 13,3 | 13,4 | 13,5 | 13,6 | 13,7 | 13,8 | 13,9 |
|------|------|------|------|------|------|------|------|
| 12,2 | 12,3 | 12,4 | 12,5 | 12,6 | 12,7 | 12,8 | 12,9 |
| 11,2 | 11,3 | 11,4 | 11,5 | 11,6 | 11,7 | 11,8 | 11,9 |
| 10,2 | 10,3 | 10,4 | 10,5 | 10,6 | 10,7 | 10,8 | 10,9 |
| 9,2  | 9,3  | 9,4  | 9,5  | 9,6  | 9,7  | 9,8  | 9,9  |
| 14,2 | 14,3 | 14,4 | 14,5 | 14,6 | 14,7 | 14,8 | 14,9 |
| scratchpad space | | | | | | | |

FIG. 12

| 13,10 | 13,3 | 13,4 | 13,5 | 13,6 | 13,7 | 13,8 | 13,9 |
|---|---|---|---|---|---|---|---|
| 12,10 | 12,3 | 12,4 | 12,5 | 12,6 | 12,7 | 12,8 | 12,9 |
| 11,10 | 11,3 | 11,4 | 11,5 | 11,6 | 11,7 | 11,8 | 11,9 |
| 10,10 | 10,3 | 10,4 | 10,5 | 10,6 | 10,7 | 10,8 | 10,9 |
| 9,10 | 9,3 | 9,4 | 9,5 | 9,6 | 9,7 | 9,8 | 9,9 |
| 14,10 | 14,3 | 14,4 | 14,5 | 14,6 | 14,7 | 14,8 | 14,9 |
| scratchpad space | | | | | | | |

FIG. 13

| 13,10 | 13,3 | 13,4 | 13,5 | 13,6 | 13,7 | 13,8 | 13,9 |
|---|---|---|---|---|---|---|---|
| 12,10 | 12,3 | 12,4 | 12,5 | 12,6 | 12,7 | 12,8 | 12,9 |
| 11,10 | 11,3 | 11,4 | 11,5 | 11,6 | 11,7 | 11,8 | 11,9 |
| 10,10 | 10,3 | 10,4 | 10,5 | 10,6 | 10,7 | 10,8 | 10,9 |
| 15,10 | 15,3 | 15,4 | 15,5 | 15,6 | 15,7 | 15,8 | 15,9 |
| 14,10 | 14,3 | 14,4 | 14,5 | 14,6 | 14,7 | 14,8 | 14,9 |
| scratchpad space | | | | | | | |

FIG. 14

| 13,10 | 13,3 | 13,4 | 13,5 | 13,6 | 13,7 | 13,8 | 13,9 |
|---|---|---|---|---|---|---|---|
| 12,10 | 12,3 | 12,4 | 12,5 | 12,6 | 12,7 | 12,8 | 12,9 |
| 11,10 | 11,3 | 11,4 | 11,5 | 11,6 | 11,7 | 11,8 | 11,9 |
| 16,10 | 16,3 | 16,4 | 16,5 | 16,6 | 16,7 | 16,8 | 16,9 |
| 15,10 | 15,3 | 15,4 | 15,5 | 15,6 | 15,7 | 15,8 | 15,9 |
| 14,10 | 14,3 | 14,4 | 14,5 | 14,6 | 14,7 | 14,8 | 14,9 |
| scratchpad space | | | | | | | |

FIG. 15

| 13,10 | 13,11 | 13,4 | 13,5 | 13,6 | 13,7 | 13,8 | 13,9 |
|---|---|---|---|---|---|---|---|
| 12,10 | 12,11 | 12,4 | 12,5 | 12,6 | 12,7 | 12,8 | 12,9 |
| 11,10 | 11,11 | 11,4 | 11,5 | 11,6 | 11,7 | 11,8 | 11,9 |
| 16,10 | 16,11 | 16,4 | 16,5 | 16,6 | 16,7 | 16,8 | 16,9 |
| 15,10 | 15,11 | 15,4 | 15,5 | 15,6 | 15,7 | 15,8 | 15,9 |
| 14,10 | 14,11 | 14,4 | 14,5 | 14,6 | 14,7 | 14,8 | 14,9 |
| scratchpad space | | | | | | | |

FIG. 16

| 13,10 | 13,11 | 13,4 | 13,5 | 13,6 | 13,7 | 13,8 | 13,9 |
|---|---|---|---|---|---|---|---|
| 12,10 | 12,11 | 12,4 | 12,5 | 12,6 | 12,7 | 12,8 | 12,9 |
| 11,10 | 11,11 | 11,4 | 11,5 | 11,6 | 11,7 | 11,8 | 11,9 |
| 16,10 | 16,11 | 16,4 | 16,5 | 16,6 | 16,7 | 16,8 | 16,9 |
| 15,10 | 15,11 | 15,4 | 15,5 | 15,6 | 15,7 | 15,8 | 15,9 |
| 14,10 | 14,11 | 14,4 | 14,5 | 14,6 | 14,7 | 14,8 | 14,9 |
| scratchpad space ||||||||

FIG. 17

SPATIAL CACHE

TECHNICAL FIELD

Disclosed are embodiments related to a specialized type of cache memory.

BACKGROUND

Semiconductor memory, including cache, is arranged and addressed linearly. When processing multi-dimensional objects (such as two-dimensional images or matrices), such objects are "flattened out" such as by concatenating one row after another. For some types of processing algorithms, particular portions of the multi-dimensional objects may need to be accessed that do not fit in well with this linear arrangement of memory. For example, a plurality of points within a small distance of a center point may need to be accessed for some processing, but because these points may be stored sequentially in locations that are far away from each other and at irregular spacings, current memory and cache access can be inefficient, slow, and require a number of different read operations to access the desired data.

SUMMARY

Accordingly, there is a need for an improved cache, for example, such as may improve read flexibility and bandwidth when processing two-dimensional data structures such as images or matrices. Embodiments provide for a cache that is able to represent portions of multi-dimensional objects (such as two-dimensional images or matrices) in a non-linear manner, allowing for example nearby pixels of an image to be efficiently accessed.

According to a first aspect, a cache is provided. The cache includes a p (rows)×q (columns) array of memory units; a row addressing unit; and a column addressing unit. Each memory unit has an m (rows)×n (columns) array of memory cells. The column addressing unit has, for each memory unit, m n-to-one multiplexers, one associated with each of the m rows of the memory unit, wherein each n-to-one multiplexer has an input coupled to each of the n memory cells associated with the row associated with that multiplexer. The row addressing unit has, for each memory unit, n m-to-one multiplexers, one associated with each of the n columns of the memory unit, wherein each m-to-one multiplexer has an input coupled to each of the m memory cells associated with the column associated with that multiplexer. The row addressing unit and column addressing unit support reading and/or writing of the array of memory units, such that multiple rows and/or columns of the array of memory units may be read and/or written in parallel.

In some embodiments, m=n=4 and each memory cell comprises one byte, such that each memory unit comprises 16 bytes, and wherein p=q=8, such that the array of memory units comprises 1024 bytes. In some embodiments, the row addressing unit and column addressing unit support reading and/or writing to multiple rows and/or columns of the memory cells of one or more of the memory units in a single clock cycle. In some embodiments, the row addressing unit is able to address up to p*m rows of memory cells across one or more of the array of memory units and read any cell in each of the p*m rows, where no two such cells are in the same row.

In some embodiments, the column addressing unit is able to address up to q*n columns of memory cells across one or more of the array of memory units and read any cell in each of the q*n columns, where no two such cells are in the same column. In some embodiments, the row addressing unit further has, for each memory unit not in the first row of the array of memory units, a two-to-one multiplexer having an input coupled to an output of the n-to-one multiplexer associated with each column of the memory unit and an output of the n-to-one multiplexer associated with the memory unit in the preceding row, and the column addressing unit further has, for each memory unit not in the first column of the array of memory units, a two-to-one multiplexer having an input coupled to an output of the m-to-one multiplexer associated with each row of the memory unit and an output of the m-to-one multiplexer associated with the memory unit in the preceding column.

In some embodiments, the row addressing unit and the column addressing unit each support reading of the memory cells of the array of memory units, and wherein the row addressing unit supports writing of the memory cells of the array of memory units. In some embodiments, only the row addressing unit supports writing of the memory cells of the array of memory units, such that the column addressing unit does not support writing of the memory cells of the array of memory units. In some embodiments, a memory unit in the p×q array of memory units represents the minimum entity that may be represented by a virtual address.

In some embodiments, such that for each memory unit in the p×q array of memory units, each memory cell within the memory unit is the smallest addressable quantum of data in the cache and has only a physical address within the memory unit. In some embodiments, the row addressing unit has separate addresses for each of the q*n columns and the column addressing unit has separate addresses for each of the p*m rows, such that the row and column addressing units support concurrently reading and/or writing up to p*m memory cells from different rows and up to q*n memory cells from different columns within the array of memory units and the array of memory cells within each memory unit.

In some embodiments, the cache further includes a load/store unit capable of filling some or all of the memory cells with remote memory that represents a two-dimensional data structure, and a control and decode circuit capable of translating a virtual address representing a part of the two-dimensional data structure represented by remote memory to control signals for directing the row and column addressing units to access particular memory cells. In some embodiments, the control and decode circuit maintains an operand region having a virtual origin, such that the virtual origin serves as a reference point for an address template comprising a plurality of virtual addresses for the remote memory and wherein the control and decode circuit is further capable of decoding the address template to determine the plurality of virtual addresses. In some embodiments, the control and decode circuit is further capable of manipulating the virtual origin and instructing a load/store unit to initialize and/or update memory cells by reading data from the remote memory as the virtual origin is manipulated.

According to a second aspect, a method of accessing a cache according to any one of the embodiments of the first aspect is provided. The method includes initializing a first plurality of the memory units with remote memory that represents a two-dimensional data structure; and accessing one or more memory cells within the first plurality of memory units by the row and/or column addressing units with a virtual address indicating a part of the two-dimensional data structure represented by the contents of the respective memory cell.

In some embodiments, the method further includes translating the virtual address indicating a part of the two dimensional data structure into a physical address indicating the respective memory cell. In some embodiments, the method further includes forming read control signals and sending the read control signals to the row and/or column addressing units to read the contents of the respective memory cell. In some embodiments, accessing one or more memory cells within the first plurality of memory units by the row and/or column addressing units with a virtual address indicating a part of the two-dimensional data structure represented by the contents of the respective memory cell comprises: decoding an address template having a plurality of virtual addresses; and forming an operand vector with the contents of memory cells corresponding to each of the plurality of virtual addresses.

In some embodiments, the method further includes maintaining an operand region having a virtual origin, wherein the operand region encompasses memory units representing a part of the two-dimensional data structure. In some embodiments, the method further includes moving the virtual origin and the operand region associated with the virtual origin; and initializing a second plurality of the memory units with remote memory that represents the two-dimensional data structure, such that the second plurality of the memory units represents a part of the two-dimensional data structure in response to the moving the virtual origin and the operand region associated with the virtual origin.

In some embodiments, initializing a second plurality of the memory units with remote memory that represents the two-dimensional data structure, such that the second plurality of the memory units represents a part of the two-dimensional data structure in response to the moving the virtual origin and the operand region associated with the virtual origin comprises one of: (1) replacing a previous left-most column of memory units with a new right-most column of memory units and reassigning the virtual address of the new column as the sum of the virtual address of the previous right-most column plus the width of a single memory unit, in response to moving the virtual origin and the operand region associated with the virtual origin to the right; (2) replacing a previous right-most column of memory units with a new left-most column of memory units and reassigning the virtual address of the new column as the difference between the virtual address of the previous right-most column minus the width of a single memory unit, in response to moving the virtual origin and the operand region associated with the virtual origin to the left; (3) replacing a previous bottom-most row of memory units with a new top-most row of memory units and reassigning the virtual address of the new row as the sum of the virtual address of the previous top-most row plus the height of a single memory unit, in response to moving the virtual origin and the operand region associated with the virtual origin up; and (4) replacing a previous top-most row of memory units with a new bottom-most row of memory units and reassigning the virtual address of the new row as the difference between the virtual address of the previous bottom-most row minus the height of a single memory unit, in response to moving the virtual origin and the operand region associated with the virtual origin down.

In some embodiments, only a subset of the array of memory units is used to store data corresponding to the two-dimensional data structure as part of processing the two-dimensional data structure, and the remaining part of the array of memory units is used for scratchpad space. In some embodiments, the two-dimensional data structure comprises image data. In some embodiments, the two-dimensional data structure comprises a matrix.

BRIEF DESCRIPTION OF THE DRAWINGS

The accompanying drawings, which are incorporated herein and form part of the specification, illustrate various embodiments.

FIG. 11 illustrates an initialized cache.
FIG. 12 illustrates a modified cache.
FIG. 13 illustrates a further modified cache.
FIG. 14 illustrates a further modified cache.
FIG. 15 illustrates a further modified cache.
FIG. 16 illustrates a further modified cache.
FIG. 17 illustrates a further modified cache.

DETAILED DESCRIPTION

Figure 1:
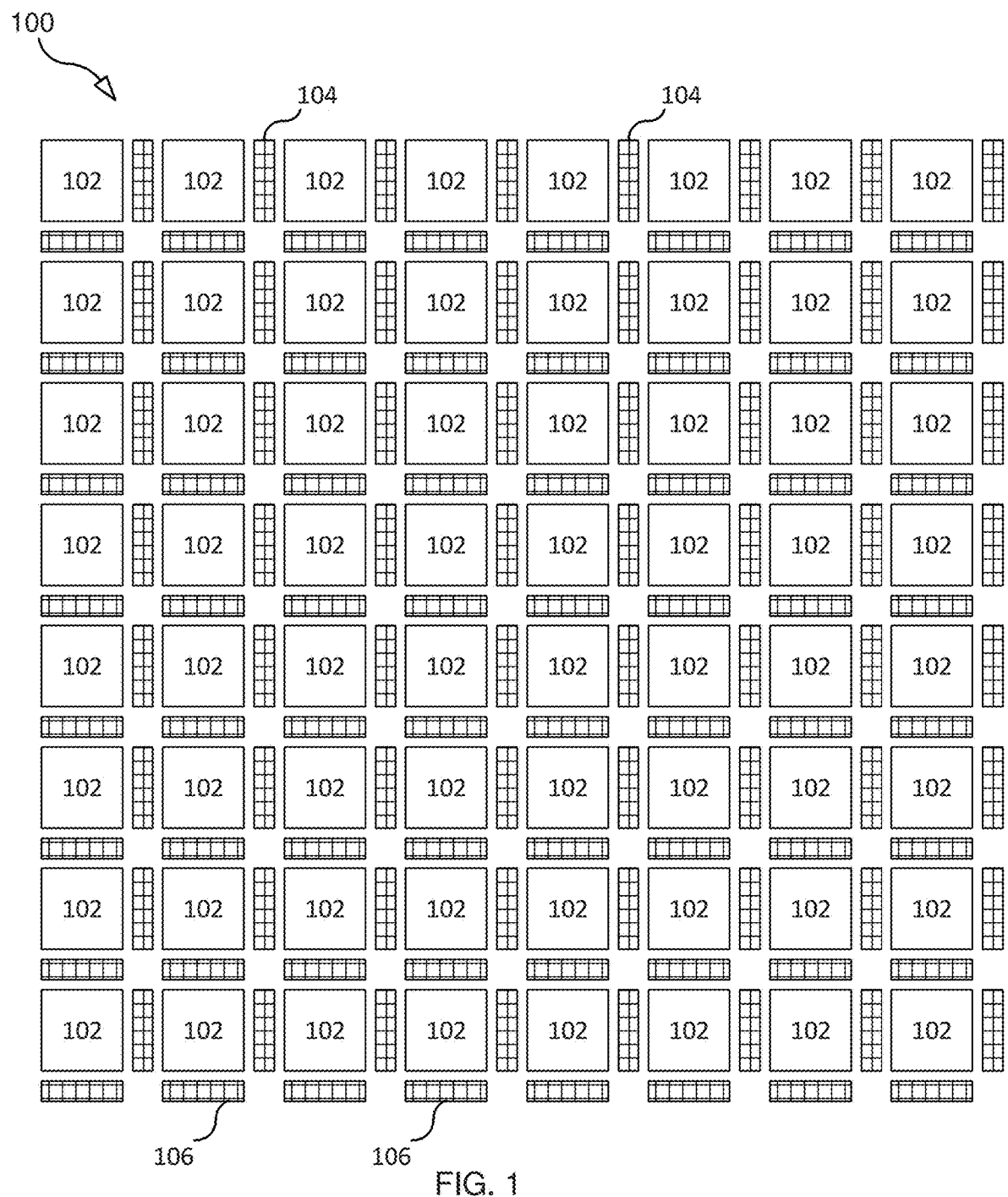
FIG. 1 illustrates a cache according to an embodiment.

FIG. 1 illustrates a cache 100 according to an embodiment.

Cache 100 may include one or more memory units 102, one or more multiplexers 104, and one or more multiplexers 106.

As shown, memory units 102 are arranged in a p×q array (having p rows and q columns of memory units 102). In the illustrated embodiment, $p=q=8=2^3$. In general, other values of p and q may be used, such as other powers of 2, or more generally any other value. The values of p and q may be the same or they may differ from each other. The array may be a logical grouping of the memory units, not necessarily indicative of their physical implementation e.g. on silicon.

Multiplexers 104, 106 may be arranged in cache 100 in a variety of different ways. For example, as shown, there is a multiplexer 104 between each memory unit 102 in a given row of memory units 102 and an additional multiplexer 104 at the end of the row of memory units 102 (resulting in q multiplexers 104 for each row of memory units 102); and, likewise, there is a multiplexer 106 between each memory unit 102 in a given column of memory units 102 and an additional multiplexer 106 at the end of the column of memory units 102 (resulting in p multiplexers 106 for each column of memory units 102). In this configuration, each memory unit 102 may be considered as being associated with one multiplexer 104 and one multiplexer 106, the multiplexer 104 shown to the right of the memory unit 102 and the multiplexer 106 shown to the bottom of the memory unit 102.

The multiplexers 104 are used to address the columns of memory units 102 and memory cells, and the collection of multiplexers 104 may be referred to herein as a column addressing unit. To be clear, the column addressing unit refers to the structure of the collection of multiplexers 104. In the illustrated embodiment, the column addressing unit reads data in a left-to-right flow with respect to the memory units 102 and memory cells shown.

The multiplexers 106 are used to address the rows of memory units 102 and memory cells, and the collection of multiplexers 106 may be referred to herein as a row addressing unit. To be clear, the row addressing unit refers to the structure of the collection of multiplexers 106. In the illustrated embodiment, the row addressing unit reads data in a top-to-bottom flow with respect to the memory units 102 and memory cells shown.

Figure 2:
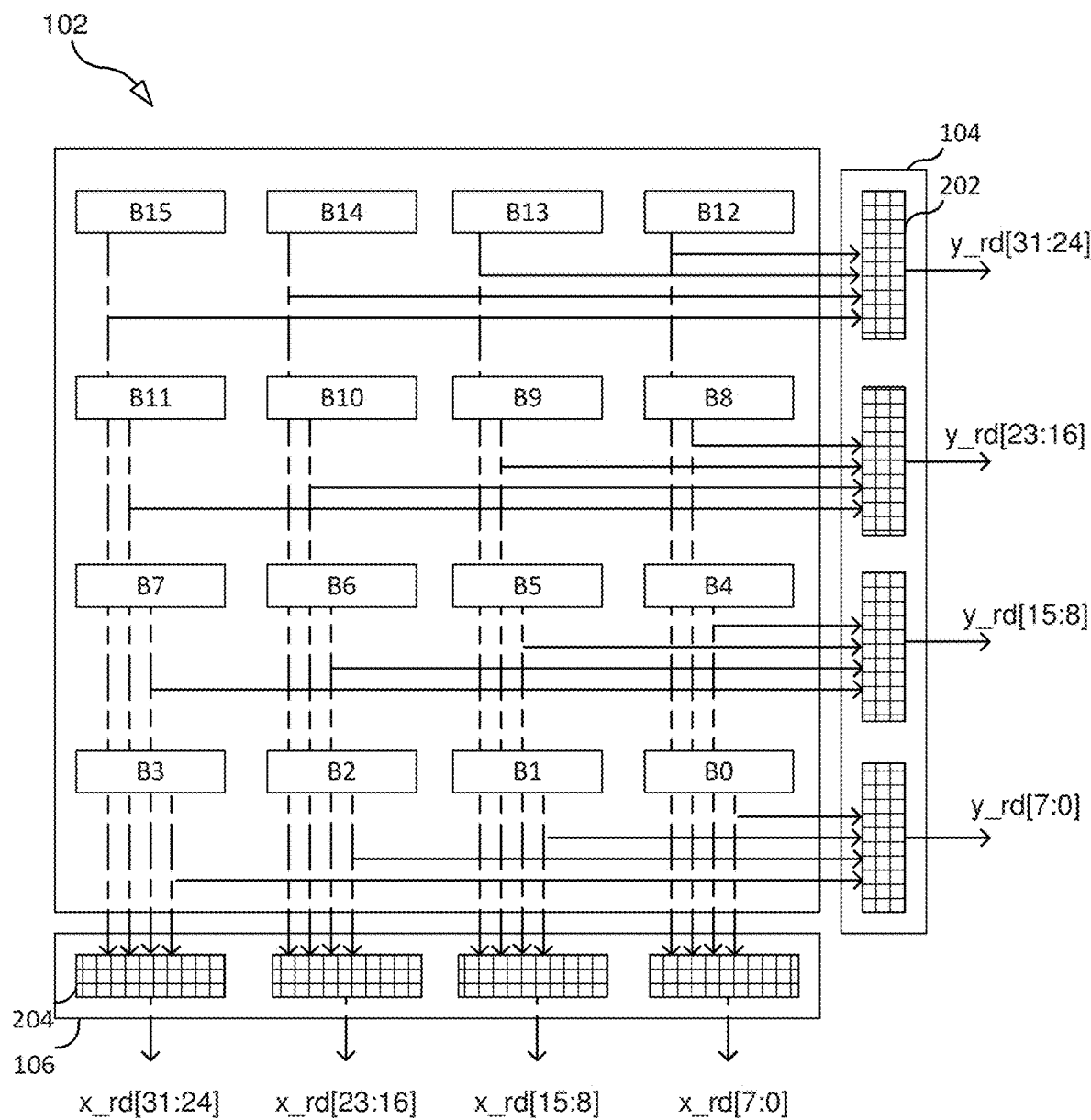
FIG. 2 illustrates a memory unit according to an embodiment.

FIG. 2 illustrates a memory unit 102 according to an embodiment. The two multiplexers 104 and 106 associated with the memory unit 102 are also illustrated.

Each memory unit 102 may include one or more memory cells, labeled as B0-B15 in the figure. As shown, the memory cells B0-B15 are arranged in an m×n array (having m rows and n columns of memory cells). In the illustrated embodiment, m=n=4=$2^2$. In general, other values of in and n may be used, such as other powers of 2, and typically the m×n array would be at least as large as 2×2. The values of in and n may be the same or they may differ from each other. The array may be a logical grouping of the memory cells, not necessarily indicative of their physical implementation e.g. on silicon.

In some embodiments, a memory cell may constitute one byte of memory. For the illustrated embodiment, that means that the memory unit 102 constitutes 16 bytes (=m*n*1 byte=4*4*1 byte) and the cache 100 constitutes 1 kilobyte (=p*q*16 bytes=8*8*16 bytes). In general, the size of a memory cell may constitute any particular quantum of memory appropriate for a particular application, meaning that the memory unit 102 and cache 100 may also constitute any particular quantum of memory appropriate for a particular application. Typically, for implementation purposes, the quantum of memory for each of the memory cell, memory unit 102, and cache 100 will be a power of 2.

For purposes of discussion, the columns of memory unit 102 refer to the m memory cells in a particular one of the n columns. As shown, there are four memory cells in each of the four columns of memory cells. The first column of memory cells includes B15, B11, B7, and B3; the second includes B14, B10, B6, and B2; the third includes B13, B9, B5, and B1; and the fourth includes B12, B8, B4, and B0. Similarly, the rows of memory unit 102 refer to the n memory cells in a particular one of the m rows of memory cells. As shown, there are four memory cells in each of the four rows of memory cells. The first row of memory cells includes B15, B14, B13, and B12; the second row includes B11, B10, B9, and B8; the third row includes B7, B6, B5, and B4; and the fourth row includes B3, B2, B1, and B0.

The multiplexer 104 (shown on the right of memory unit 102) may be used to address the columns of the memory unit 102. As shown, multiplexer 104 includes a number of multiplexers 202. Specifically, multiplexer 104 may include m multiplexers 202, where the multiplexers 202 may each be n-to-1 multiplexers. Each of the multiplexers 202 may correspond to a particular row of memory cells, and each may be connected to the memory cells in that row of memory cells. For example, as illustrated, the top-most multiplexer 202 in FIG. 2 is associated with the first row of memory cells and connected to inputs B15, B14, B13, and B12 corresponding to the memory cells of the first row of memory cells. Likewise, the multiplexer 202 below the top-most multiplexer in FIG. 2 is associated with the second row of memory cells and connected to inputs B11, B10, B9, and B8 corresponding to the second row of memory cells. The other multiplexers 202 are similarly shown as being associated with a row of the memory cells and connected to the memory cells in their associated row as inputs. Each of the multiplexers 202 has a single output, which corresponds to a selection of one of its inputs.

The exemplary connections between the memory cells and the multiplexers 202 are shown with solid arrows. The solid arrows connect to a dashed arrow that leads to a corresponding memory cell. The output of the multiplexer 202 is also shown by an arrow. The text over the output arrow indicates a particular portion of a memory output that the multiplexer 202 corresponds to. For example, as shown there are four multiplexers 202, each selecting from a memory unit of one byte, meaning that the combined output of the four multiplexers 202 is a 32-bit word (in this example). As illustrated, the top-most multiplexer 202 corresponds to bits [31:24] of the 32-bit word, the next multiplexer 202 corresponds to bits [23:16], the next to bits [15:8], and finally the bottom-most one to bits [7:0].

The multiplexer 106 (shown on the bottom of memory unit 102) may be used to address the rows of the memory unit 102. As shown, multiplexer 106 includes a number of multiplexers 204. Specifically, multiplexer 106 may include n multiplexers 204, where the multiplexers 204 may each be m-to-1 multiplexers. Each of the multiplexers 204 may correspond to a particular column of memory cells, and each may be connected to the memory cells in that column. For example, as illustrated, the left-most multiplexer 204 in FIG. 2 is associated with the first column of memory cells and connected to inputs B15, B11, B7, and B3 corresponding to the memory cells of the first column of memory cells. Likewise, the multiplexer 204 to the right of the left-most multiplexer in FIG. 2 is associated with the second column of memory cells and connected to inputs B14, B10, B6, and B2 corresponding to the second column of memory cells. The other multiplexers 204 are similarly shown as being associated with a column of the memory cells and connected to the memory cells in their associated columns as inputs. Each of the multiplexers 202 has a single output, which corresponds to a selection of one of its inputs.

The exemplary connections between the memory cells and the multiplexers 204 are shown with dashed arrows. The dashed arrows lead directly from a memory cell to a corresponding multiplexer 204. The output of the multiplexer 204 is also shown by an arrow. The text over the output arrow indicates a particular portion of a memory output that the multiplexer 204 corresponds to. For example, as shown there are four multiplexers 204, each selecting from a memory unit of one byte, meaning that the combined output of the four multiplexers 204 is a 32-bit word (in this example). As illustrated, the left-most multiplexer 204 corresponds to bits [31:24] of the 32-bit word, the next multiplexer 204 corresponds to bits [23:16], the next to bits [15:8], and finally the right-most one to bits [7:0].

In addition to the multiplexers 202, 204, that can select a desired memory output from a memory cell 202 (e.g., the illustrated 32-bit word), the multiplexers 104, 106 may further include additional multiplexers. For example, each multiplexer 104 (except for the multiplexer 104 associated with the left-most column of memory units 102) may include a 2-to-1 multiplexer for each row of the memory unit 102 that either passes the output of the memory unit 102 that the multiplexer 104 is associated with or passes the output of the multiplexer 104 associated with the column of memory units 102 immediately to the left of the multiplexer 104. Similarly, for example, each multiplexer 106 (except for the multiplexer 106 associated with the top-most row of memory units 102) may include a 2-to-1 multiplexer for each column of the memory unit 102 that either passes the output of the memory unit 102 that the multiplexer 106 is associated with or passes the output of the multiplexer 106 associated with the row of memory units 102 immediately above the multiplexer 104.

As just described, the column addressing unit (that is, the collection of multiplexers 104) may include p*m multiplexers that are each (n*q)-to-1 multiplexers, with n-to-1 multiplexers for each memory unit 102 and a q-to-1 multiplexer to select the output from one of the columns of memory units 102. These p*m (n*q)-to-1 multiplexers may be implemented in a number of ways that are functionally equivalent. For example, the q-to-1 part may be distributed as q 2-to-1 multiplexers. Taking q=8 as an example, eight 2-to-1 multiplexers in a tree may be equivalent to one 8-to-1 multiplexer. In general, the multiplexers of the column addressing unit may be distributed in a modular way such that it is physically realizable as a circuit. The specific implementation may also be further optimized, such as to improve the interconnections between the memory cells and the multiplexers.

Similarly, the row addressing unit (that is, the collection of multiplexers 106) may include q*n multiplexers that are each (m*p)-to-1 multiplexers, with p-to-1 multiplexers for each memory unit 102 and a p-to-1 multiplexer to select the output from one of the rows of memory units 102. These q*n (m*p)-to-1 multiplexers may be implemented in a number of ways that are functionally equivalent. For example, the p-to-1 part may be distributed as p 2-to-1 multiplexers. Taking p=8 as an example, eight 2-to-1 multiplexers in a tree may be equivalent to one 8-to-1 multiplexer. In general, the multiplexers of the row addressing unit may be distributed in a modular way such that it is physically realizable as a circuit. The specific implementation may also be further optimized, such as to improve the interconnections between the memory cells and the multiplexers.

Cache 100 supports a flexible approach to read and write operations.

Regarding read operations, cache 100 may be considered to have two read ports, an "X" port and a "Y" port. The "X" port reads in a vertical direction (as shown in FIGS. 1 and 2), based on the row addressing unit, such as top to bottom. The "Y" port reads in a horizontal direction (as shown in FIGS. 1 and 2), based on the column addressing unit, such as left to right. Lane select signals can select which memory cells are read from in order to form an output.

With respect to read operations within an individual memory unit 102, FIG. 2 labels the "X" port as "x_rd" and the "Y" port as "y_rd". As an example read operation on the "X" port, the bytes B15, B14, B13, and B12 (corresponding to the first row of memory cells) may be read, where each multiplexer 204 is signaled to select as its output the memory cell in the first row of memory cells corresponding to the column of memory cells associated with the multiplexer 204. In a similar manner, the bytes of other rows of memory cells may also be read. Other read patterns are also possible. For example, another read operation may read bytes B3, B6, B9, B12 (a staircase type of pattern), such as by the multiplexers 204 being signaled to select as their output the memory cell in increasing rows of memory cells corresponding to the column of memory cells associated with the multiplexer 204. Likewise, byte patterns such as B15, B10, B9, B4; or B7, B6, B8, and B9 may be read. In the embodiment illustrated in FIG. 2, however, two bytes in the same column of memory cells (such as bytes B3, B7) cannot be read by the "X" port, since they would both have to be selected by the same multiplexer 204 which has only one output. As will be apparent when the "Y" port is described, two bytes in the same column of memory cells can, however, be read by the "Y" port. In general, the "X" port may read an arbitrary pattern of bytes, as long as two bytes in the same column of memory cells are not read together.

As an example read operation on the "Y" port, the bytes B15, B11, B7, and B3 (corresponding to the first column of memory cells) may be read, where each multiplexer 202 is signaled to select as its output the memory cell in the first column of memory cells corresponding to the row of memory cells associated with the multiplexer 202. In a similar manner, the bytes of other columns of memory cells may also be read. Other read patterns are also possible. For example, another read operation may read bytes B3, B6, B9, B12 (a staircase type of pattern), such as by the multiplexers 202 being signaled to select as their output the memory cell in decreasing columns of memory cells corresponding to the row of memory cells associated with the multiplexer 202. Likewise, byte patterns such as B15, B10, B6, B1; or B14, B10, B5, and B1 may be read. In the embodiment illustrated in FIG. 2, however, two bytes in the same row of memory cells (such as bytes B5, B4) cannot be read by the "Y" port, since they would both have to be selected by the same multiplexer 202 which has only one output. Two such bytes in the same row of memory cells can, however, be read by the "X" port. In general, the "Y" port may read an arbitrary pattern of bytes, as long as two bytes in the same row of memory cells are not read together.

The read operation for the cache 100 operates similarly as just described for the individual memory units 102. In a given read cycle (e.g., corresponding to a single clock cycle), each of the "X" and "Y" ports can be signaled to select up to m memory cells for each column of memory units 102 (for the "X" port) or up to n memory cells for each row of memory units 102 (for the "Y" port), up to a maximum of q*m memory cells (for the "X" port, across the entire cache) or up to a maximum of p*n memory cells (for the "Y" port, across the entire cache). With the illustrated values of p, q, m, and n, that equates to up to 4 bytes being read from each row or column of memory units 102, up to a maximum of 32 bytes. Some rows or columns of memory units 102 may not have any memory cells selected, and some rows or columns of memory units 102 may have only some of their memory units selected. The memory that is read by the "X" and/or "Y" ports may be assembled (e.g., by concatenating the bytes that are read together) into a vector (e.g., an operand vector) so that a processing element may operate on it. The processing element (such as vector processor 902 shown in FIG. 9) may be designed to operate on a certain size of data, e.g. 128 bits, such as a single instruction multiple data (SIMD) processing element.

Preparing a vector for the processing element may further include additional multiplexing and alignment operations for both the "X" and "Y" ports in order to transfer only the relevant set of memory (e.g., corresponding to only relevant pixels) from the cache 100 to the vector that the processing element operates on. In some cases, it may be useful to select and read memory (e.g., corresponding to pixels) from the entire breadth of the cache 100, such as from any memory cell of any of the memory units 102. In other cases, it may be possible to isolate a smaller region of interest, and therefore to improve efficiency (e.g., power efficiency) by focusing on the smaller region of interest. This embodiment will be described below.

Multiple rows or columns of memory cells may be read in parallel. An address template (described below) may be used to facilitate such reading. Reading different patterns of memory cells, such as in this manner, may be particularly useful in certain applications, such as those related to analyzing or processing images, including extracting image features. Linear algebra may also be another application area. For example, the "X" read port may provide access to a row of data and the "Y" read port may provide access to a column of data in the same read cycle (e.g., corresponding to a single clock cycle), which may benefit some algorithms. More generally, other types of multi-dimensional data can be accessed in a non-linear manner by embodiments disclosed herein, and therefore algorithms that may need to access data in a non-linear manner may benefit by these embodiments.

Figure 3:
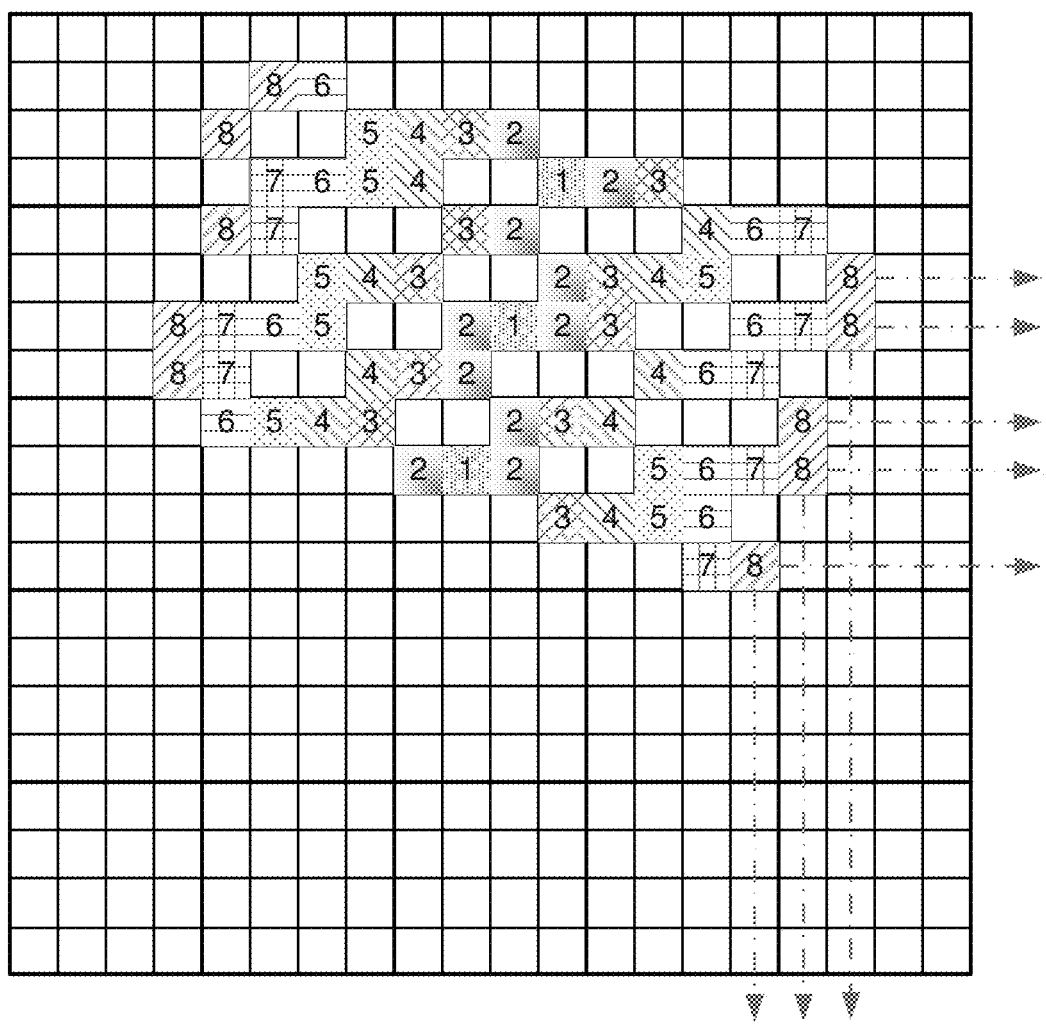
FIG. 3 illustrates an image being analyzed by an image analysis algorithm.

The complex addressing scheme for the read operations may introduce a tradeoff in wiring complexity and reading flexibility. In some applications, it may be desirable to implement a flexible read operation only in one of the "X" or "Y" ports during a given clock cycle. However, in other applications, the flexibility of having a read operation in both the "X" and "Y" ports within the same clock cycle may be helpful and worth the trade-off in complexity and additional power. For example, FIG. 3 illustrates an example image that is being analyzed by an image processing algorithm. The numbers "1," "2," "3," and so on, up to "8," in the boxes (representing a sub-region of the image such as a pixel) denote paths that need to be analyzed, with like numbers denoting the same paths. For the algorithm to access the right-most path denoted by the "8" in a single read cycle, the "Y" port is needed because in the "X" port four of the five sub-regions have a read contention in the vertical direction (see dashed horizontal arrows). If the "X" port were used, it would take two read cycles to read them (see dashed vertical arrows). On the other hand, other times the algorithm may find it more efficient to use the "X" port. In such cases, it is beneficial to have the flexible reading offered by both of the "X" and "Y" ports. In other cases, such as where there is a read contention in both the "X" port and the "Y" port, it can be useful to read from both the "X" and "Y" ports in the same clock cycle. This can reduce the total number of clock cycles required to read a given set of memory cells.

Regarding write operations, cache 100 may support a similar ability as with read operations, to allow for near arbitrary write operations. In some embodiments, however, writing may be implemented in a much simpler manner, such as by allowing the writing only in the "X" port for bytes in the same row of memory cells, or only in the "Y" port for bytes in the same column of memory cells, or for either writing in the "X" or "Y" ports, but only for the same row or column of memory cells respectively. For example, writing may be the same operation as in a normal register file. In some applications, the usefulness of being able to perform different read patterns does not necessarily carry over to writing, and therefore the cache 100 may be implemented more simply by having a simpler write operation. For example, an image analysis algorithm may be able to exploit particular access patterns to analyze an image, but may not need to update the image using those access patterns.

The part of the memory units 102 used for processing is referred to as the virtual canvas. As described herein, this may include all of the memory units 102, or a subset thereof. By extension (analogously to that described for the operand region 402), the virtual canvas may also refer to the contents of remote memory currently being mirrored in those memory units 102.

Typically, the virtual canvas of the cache may be a read-centric resource and can rely on the tendency for an application to perform substantially more reads from remote memory than writes during processing (e.g., image filtering). For example, during image analysis, some applications may perform no writes at all to the image memory. Therefore, some embodiments of the cache may rely primarily or exclusively on "write around" behavior, and not have mechanisms for "write through" or "write back" behavior that some other caches employ. The "write through," "write back," and "write around" behavior refers to signaling I/O completion when writing, and specifically whether I/O completion is signaled when the remote memory is updated ("write around"), the cache is updated ("write back"), or only after both have been updated ("write through"). In these embodiments, the processing element may perform "write around" behavior, where the infrequent remote memory updates bypass the cache entirely and go directly to remote memory. Such behavior simplifies the operation of the cache and naturally preserves the part of the remote memory in the virtual canvas that undergoes modification from traditional spatial filtering techniques. This allows embodiments to exploit the unique demands of certain processing applications (e.g., image processing and analysis) to circumvent the performance compromises associated with maintaining cache coherence relative to remote image memory.

As discussed above, there are cases where it may be possible to isolate a smaller region of interest and to focus on that region during reading or processing operations. This smaller region of interest may be referred to as an operand region. In embodiments, the operand region may include an origin and the region may be of any particular shape or size, e.g., the operand region may be circular or ellipsoidal, and described by a radius or a length and a width.

Figure 4:
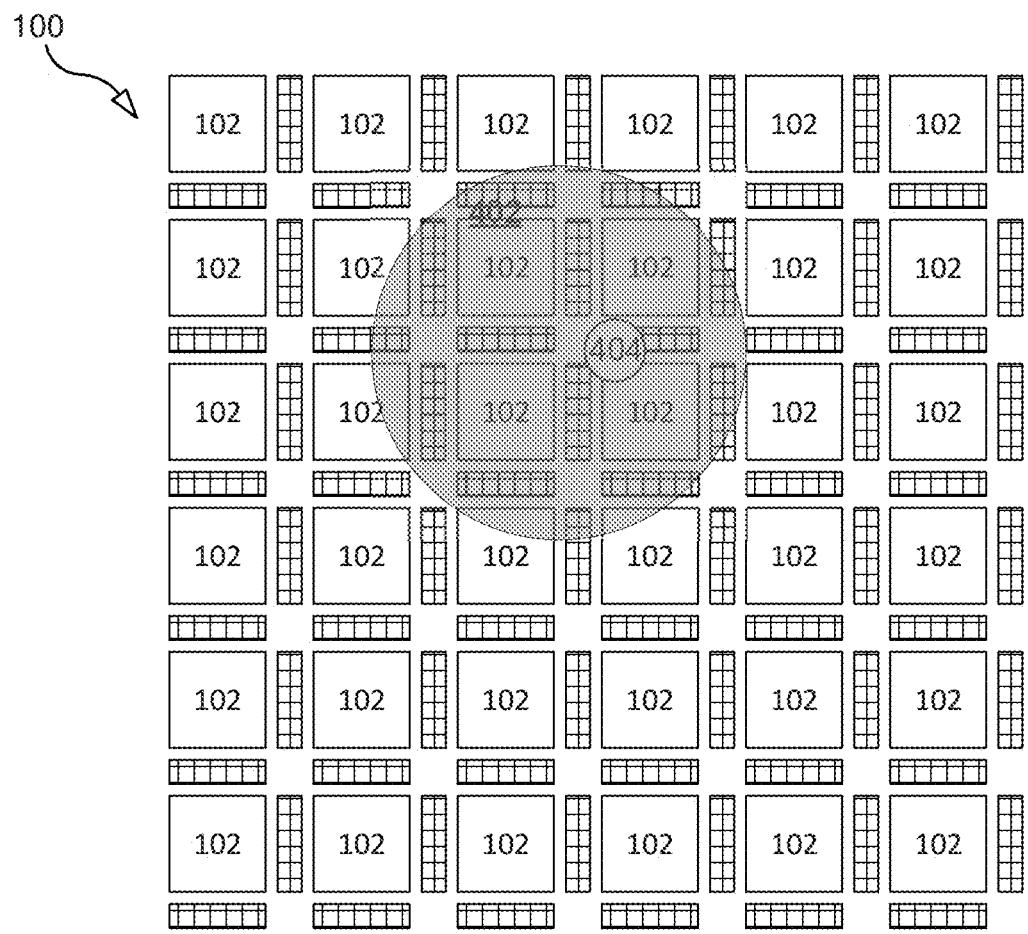
FIG. 4 illustrates an operand region according to an embodiment.

FIG. 4 illustrates an operand region 402 according to an embodiment. Cache 100 is shown with some of the memory units 102 removed for illustrative purposes. Operand region 402 is associated with a virtual origin 404 and encompasses (partially or in whole) one or more memory units 102. In the general case, the operand region 402 may be any particular shape that encompasses one or more memory units 102. As shown, the operand region 402 is a circle nearly centered at the virtual origin 404. By using address templates (such as those described herein), any operand within the operand region 402 is reachable.

Operand region 402 is illustrated in FIG. 4 as being a region encompassing one or more memory units 102. By extension, the region of remote memory represented by the contents of the one or more memory units 102 (that is, the part of remote memory being mirrored in those memory units 102) can also be considered as the operand region 402.

The scope of the operand region 402 may be determined by the design of the address template being used. For example, an address template may use a twos-complement number to refer to an initial operand relative to the virtual origin 404. For an n-bit twos-complement number, the first operand may fall anywhere in the range of $-2^n$ to $+2^{n-1}$ relative to the virtual origin 404. Additional operands may be calculated in the same way (that is, relative to the virtual origin 404), in which case the shaded operand region 402 shown in FIG. 4 is representative of the operands reachable from the virtual origin 404 by the address template. Alternatively, additional operands may be calculated as offsets from other operands, such as offsets from the previous operand. Depending on the number of operands, the number of bits used to derive each operand, and how each operand is derived, a region (the operand region 402) encompassing all of the operands reachable from the virtual origin 404 by a given address template could be an irregular shape and may cover all or almost all of the memory units 102 in the cache 100, or at least the memory units 102 that are mirroring remote memory.

Limiting the read operation to only reading memory cells within the operand region 402 may improve the efficiency of forming the operand vector for the processing element, such as improving the power efficiency.

For discussion purposes, the following description takes as an exemplary application an image analysis algorithm. The discussion should be understood as being generally applicable to other applications that may take advantage of the cache 100 described herein. Also, for discussion purposes, the cache 100 will be assumed to have p=q=8 and m=n=4, with the size of a memory cell being one byte.

The memory cells of cache 100 contain contents of remote memory, such as pixel data for an image. For this discussion, remote memory and image memory will be used interchangeably, without limiting embodiments to image data. For this discussion, cache 100 will be assumed to contain an image that is being analyzed. Typically the image data (e.g., 256×256 bytes=65536 bytes=64 KB) will be much larger than the size of cache 100 (in this example 1 KB), and therefore cache 100 will only be able to store a portion of the image data at any given time, where that portion is conceptually a two-dimensional window into the full image. For this example it is assumed that the image data has a maximum size of 64 KB.

In the discussion that follows, the terms "virtual address" and "physical address" refer to different schemes for addressing contents of the cache 100. As used here, a physical address refers to an address of the cache 100 in terms of an individual memory cell. In this example, that means that the physical address requires ten bits, five to select an "x address" and five to select a "y address" each between 0 and 31. A virtual address, on the other hand, refers to the portion of the image data that is mirrored in the cache 100. In this example, that means that the virtual address requires 16 bits, eight to select an "x address" and eight to select a "y address" each between 0 and 255 (based on the maximum size of an image in this example). In some embodiments, virtual addresses only resolve to the granularity of a memory unit 102. For example, the six most significant bits for each of the x and y portions of the virtual address may be used to refer to a particular portion of image data that fits into a memory unit 102, and the two least significant bits for each of the x and y portions of the virtual address may be used to refer to a memory cell within that memory unit 102 and therefore may correspond to the two least significant bits of the physical address representing the same memory cell. Where cache 100 is smaller than the image (i.e. the entirety of the image cannot be contained within cache 100), there will be more virtual addresses than physical addresses. There may be a mapping between virtual and physical addresses; therefore, a virtual address indirectly refers to an individual memory cell (so long as the virtual address representing image memory is currently being mirrored in the cache 100).

In some embodiments, the virtual address of the memory unit 102 corresponding to the earliest position in the image that is being read into cache 100 (e.g., the lower left memory unit 102 of the virtual canvas) must align to an even 4-byte boundary (row height and column width), but there are no other restrictions. The alignment to an even 4-byte boundary is advantageous in embodiments because that is the size of the memory unit 102 (i.e., in this example, 4 bytes×4 bytes). Because, as discussed above, virtual addressing resolves to the granularity of a single memory unit 102, by maintaining the even 4-byte boundary alignment, "virtual columns" or "virtual rows" of memory units 102 can be easily reassigned during a refresh operation, an operation that simplifies migrating the cache 100 over different portions of the remote memory. By maintaining this alignment, the migration over the remote memory may always be done in increments of 4 bytes in any given direction.

Because, in the typical case, cache 100 is not large enough to contain all of the image being analyzed at one time, in order to perform an image analysis algorithm it is advantageous to have a cache management policy to refresh the contents of cache 100. This cache management policy may take many forms. The main goal is for image data needed by an image analysis algorithm to be mirrored in cache 100 in a timely manner. For example, in some algorithms, it may be possible to predict with reasonable accuracy that image data in a certain region will be needed at a given time. As described with respect to FIG. 3, for instance, an algorithm may be following a path and may be able to predict image data based on path information. In other algorithms, there may be some other directionality to the image data being processed. In still other algorithms, other information (e.g., about the image, the algorithm, or something else) may be utilized to predict what image data may be needed.

An example of a cache management policy is to use a virtual origin 404, and to refresh the cache 100 as the virtual origin approaches a boundary of the window into the image being mirrored in cache 100. For example if the virtual origin 404 is close to the top of the image data being mirrored in the cache 100, then it may be surmised that the bottom of the image data being mirrored in the cache 100 is less likely to be needed and can be replaced (e.g., updated or refreshed) by image data located above the top that is currently being mirrored in the cache 100. In this way, the region of remote memory being mirrored in cache 100 can change to anticipate the needs of an image analysis algorithm. An image analysis algorithm may move the virtual origin 404 based on its processing in order to manage the contents of cache 100, causing the cache 100 to occasionally trigger update or refresh operations. At times, instead of updating or refreshing in this manner, the cache 100 may refresh on a demand basis (similar to a conventional central processing unit (CPU) cache), such as when an image analysis algorithm references operands outside the virtual canvas. This may result in some loss in performance, as more data needs to be read into the cache, but can also provide flexibility to an image analysis algorithm to reference arbitrary parts of the image.

As the virtual origin 404 and the associated operand region 402 move, memory cells in the cache 100 may need to be refreshed or updated with different parts of the image data. In effect, as the virtual origin 404 and the associated operand region 402 move, the portion of the image mirrored in the virtual canvas moves correspondingly, e.g. so as to keep the virtual origin 404 nearly centered within the virtual canvas. Some embodiments might bias the shape or offset of the operand region 402 relative to the virtual origin 404, or might bias the cache refresh policy to maintain the virtual origin 404 in a particular part of the virtual canvas to serve the needs of a specific application.

An example of processing an image will now be described. Prior to processing, a load/store unit (such as load/store unit 906 shown in FIG. 9) may fill some or all of the memory cells in the cache 100. For example, the load/store unit may fill the memory cells from image data stored in remote memory, such as in static random access memory (SRAM). Typically images are stored linearly in SRAM, with one row of pixels stored sequentially after another row. A sequence of reads (e.g., along rows of pixels) may be used to fill the memory cells in cache 100. Once the cache 100 is initialized with a portion of the image data, processing may occur. As processing occurs, the processing element may move the virtual origin 404 and the associated operand region 402 may move with the virtual origin 404. When the virtual origin 404 approaches an edge of the virtual canvas, such as the right edge or bottom edge, the load/store unit fetches image data from the appropriate memory addresses (i.e., addresses representing the adjacent image data to that stored in the edge being approached) to populate memory cells in cache 100 with the data. By edge of the virtual canvas, what is meant is a boundary of the window into the image from remote memory that is currently being mirrored in the virtual canvas.

As shown below, as this window moves around the image, the content being mirrored in the virtual canvas maintains virtual row or column numbers of memory units 102 in ascending order, but alters the order of physical row or column numbers in the process. When the right edge of the virtual canvas is approached, for example, a "new" column of memory units 102 in cache 100 can be populated by effectively removing a column of memory units 102 that is now the most distant from the virtual origin 404. That is, the left-most physical column of memory units 102 may be re-populated with image data from virtual addresses to the right of the right-most physical column. Similarly, when the bottom edge of the virtual canvas is approached, for example, a "new" row of memory cells in cache 100 can be populated by effectively removing a row of memory units 102 that is now the most distant from the virtual origin 404. That is, the top-most physical column of memory units 102 may be re-populated with image data from virtual addresses below the bottom-most physical column. This updating occurs without having to relocate the contents of other memory units 102 in the cache 100. A mapping (e.g., between virtual column numbers and physical column numbers) is maintained to keep track of which part of the image data (virtual address) is assigned to which memory unit 102 (physical address).

As noted above, in some embodiments the virtual address resolves only to the granularity of a memory unit 102, and the part of the virtual address that refers to a memory cell within a memory unit 102 is equal to the physical address of that memory cell within the memory unit 102. That is, one can think of the 16-bit address (in this example) as an 8-bit row address (x address) and an 8-bit column address (y address). While the term "virtual address" can refer to that entire 8-bit row or column address, only the upper or most significant 6 bits (which specify one of the 64 rows or columns of memory units 102 for the image in remote memory) are virtual, whereas the lower or least significant 2 bits (which specify one of the 4 rows or columns of a memory cell within a memory unit 102) are physical. In other words, the upper 6 bits undergo an address translation to dynamically map which physical row or column of memory units 102 in the cache 100 corresponds to the virtual row or column of the window into remote memory. The lower or least significant 2 bits do not undergo address translation and look up one of four bytes exactly as specified. Other addressing or translation schemes are also possible.

For an image of size 256×256 (64 KB), the cache 100 (in this example 1 KB) may contain at most only 1/64th of the image data. That means that the portion of the image in cache 100 at any instance is a small window into the contents of the full image. The position of this small window may move as the image is processed, but the size of the window remains the same.

Because the remote memory (e.g., SRAM) typically represents the image as a linear array of bytes, where the image size is 256×256 pixels, there will be 256 concatenated rows stored in memory that may be addressed beginning at some offset addr and up to addr+65535. One implication of this arrangement is that at any given moment cache 100 may contain 32 fragmented intervals of bytes from the linear array in remote memory, the beginning of each being separated by 256 bytes (the length of one row). For example, where the lower left memory unit 102 maps to virtual row=8 and virtual column=2, the rows of memory units 102 in the cache 100 contain linear array entries addr+2112 to addr+2143, addr+2368 to addr+2399, addr+2624 to addr+2655, and so on, up to addr+3904 to addr+3935.

Figure 10A:
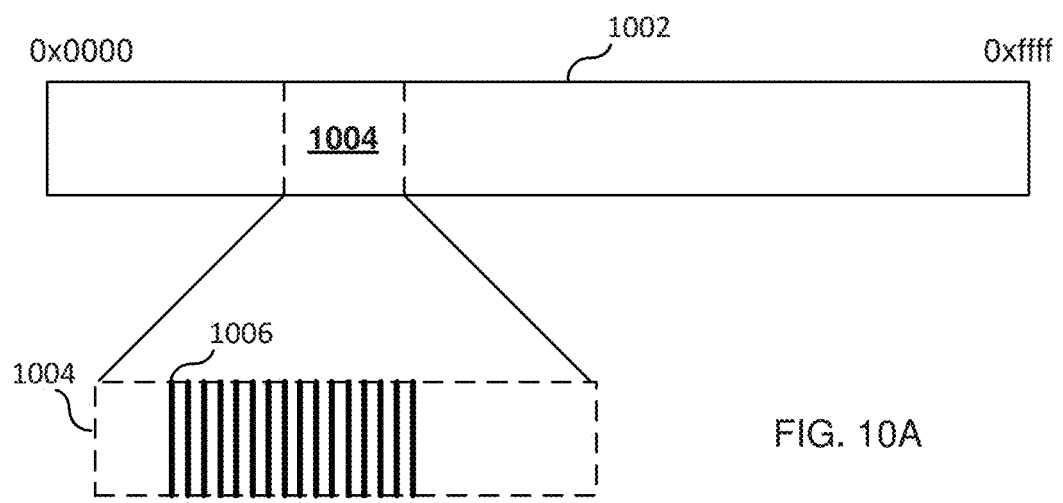
FIG. 10A illustrates a linear array of memory.
Figure 10B:
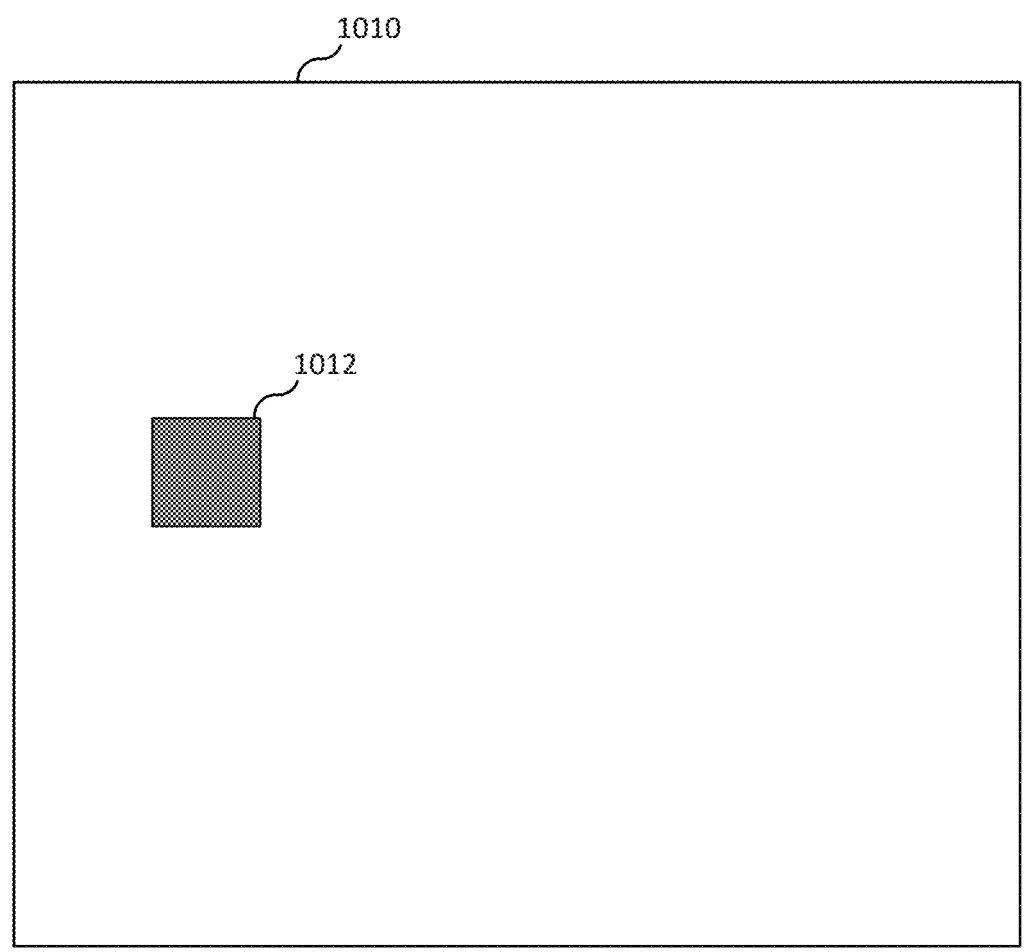
FIG. 10B illustrates a two-dimensional view of the linear array of memory.

This can be illustrated as in FIGS. 10A and 10B. FIG. 10A illustrates remote memory in a linear array of bytes 1002. For example, an image may be represented linearly by addresses ranging from 0x0000 to 0xffff (i.e. 0 to $2^{16}-1$). A portion 1004 of that memory is shown enlarged, along with a number of 32-byte stripes (or intervals) 1006. These 32-byte stripes (or intervals) are separated by 224 bytes (i.e. 256 bytes−32 bytes), which is the difference between the width of the image (256 bytes in this example) and the number of memory cells in one row of the cache 100 (i.e. q*n, which is equal to 32 bytes in this example). The sequential 32-byte stripes, each separated by the width of the image, may be filled into cache 100, e.g. starting at the lower-left memory unit 102. The linear array of bytes 1002 may also be considered as a two-dimensional structure, such as shown in FIG. 10B. The two-dimensional image 1010 may be realized on remote memory as a linear array of bytes 1002. The cache 100 may contain the contents of a portion 1012 of the image, which is the portion represented by the sequential 32-byte stripes that are each separated by the width of the image.

In some embodiments, all of the memory cells in cache 100 may be used for processing by the image processing algorithm. In other embodiments, only part of the memory units 102 in cache 100 are used for processing by the image processing algorithm. As explained above, the part of the memory units 102 used for processing is referred to as the virtual canvas. For example, only the upper half of the cache (the upper 4 rows by 8 columns of memory units 102) may be needed for low-pass image filtering, and only a subset of 6 rows by 6 columns of memory units 102 may be needed for other applications, such as performing certain other image processing algorithms, e.g. feature extraction. That then leaves at least the bottom two rows and leftmost two columns of memory units 102 available as scratchpad space, e.g. to be used for working variables, with the remainder being used as the virtual canvas (the part of the cache 100 that mirrors a section of remote memory). In some embodiments, when the load/store unit is filling the memory cells with image data, and when determining when the operand region 402 is approaching an edge of the cache, the number of memory units 102 reserved (if any) for scratchpad space is taken into consideration by only updating or refreshing the virtual canvas. That is, the number of memory units 102 that are automatically refreshed or updated is configured to the needs of a given application, which can help to minimize extraneous memory traffic.

When the processing element accesses local variables stored in the scratchpad space, it uses the physical address of the memory units 102 and treats the cache 100 as a register file. Coherent access to scratchpad space requires that refresh or update operations that affect the virtual canvas do not alter (e.g., overwrite or scramble) the memory units 102 being used as scratchpad space.

When accessing image data in cache 100, the processing element may use virtual addresses that reflect the portion of the image data mirrored in cache 100. As the virtual origin 404 approaches the left or right edges and causes a "new" row or column of memory units 102 to be populated, virtual addresses are updated. As the virtual canvas stores different parts of the remote memory, the update or refresh process may keep track of the horizontal line that marks the wraparound from max to min row index and the vertical line that marks the wraparound from max to min column index (shown as bolded lines in the example below).

The following sequence illustrates an example, where the virtual canvas of the cache 100 is 6 rows by 8 columns of memory units 102 and the scratchpad space is 2 rows by 8 columns of memory units 102. The cache 100 is initialized starting at row 8, column 2 of the image data, with that image data going to the lower-left memory unit 102.

As initialized, the cache appears as shown in FIG. 11. A load/store unit has filled the memory cells in the virtual canvas with appropriate image data. The virtual addresses of that image data are indicated above. The top-left memory unit has virtual address "13,2" (indicating that the region of the image indicated by "13,2" or virtual row 13 and virtual column 2 is mirrored in the cache at that memory unit 102), and the bottom-right memory unit 102 has virtual address "8,9". As initialized, the horizontal and vertical wraparound lines (bolded) are at the right-most and top-most edges, respectively, of the cache 100. Note that the bolded lines are conceptual boundaries that serve as aids to visualize the reallocation of virtual rows or columns of memory units during the cache refresh process. It may also be helpful for the processing element to keep track of these boundaries for managing the cache refresh policy.

As shown in FIG. 12, when the virtual canvas is moved up by one row of memory units 102 (e.g., as the virtual origin 404 approaches the top edge), the bottom-most row (i.e. the row "above" the bolded horizontal wraparound line) of the virtual canvas is vacated and filled with the part of the image adjacent to that indicated by the bolded horizontal wraparound line. After the move, the horizontal wraparound line is updated as shown, by moving up (which in this case results in the line "wrapping around" the top of the virtual canvas and moving to the bottom). By moving of the virtual canvas, it is meant that the window into the image in remote memory that is mirrored into the virtual canvas moves.

As shown in FIG. 13, when the virtual canvas is moved to the right by one column of memory units 102 e.g., as the virtual origin 404 approaches the right edge), the left-most column of memory units 102 (indicated by the bolded vertical wraparound line) of the virtual canvas is vacated and filled with the part of the image adjacent to that indicated by the bolded vertical wraparound line. After the move, the vertical wraparound line is updated as shown, by moving right (which in this case results in the line "wrapping around" the right-part of the virtual canvas and moving to the left part).

As shown in FIG. 14, when the virtual canvas is moved up by one row of memory units 102 (e.g., as the virtual origin 404 approaches the top edge), the second-to-bottom-most row of memory units 102 (indicated by the bolded horizontal wraparound line) of the virtual canvas is vacated and filled with the part of the image adjacent to that indicated by the bolded horizontal wraparound line. After the move, the horizontal wraparound line is updated as shown, by moving up.

As shown in FIG. 15, when the virtual canvas is moved up by one row of memory units 102 (e.g., as the virtual origin 404 approaches the top edge), the third-to-bottom-most row of memory units 102 (indicated by the bolded horizontal wraparound line) of the virtual canvas is vacated and filled with the part of the image adjacent to that indicated by the bolded horizontal wraparound line. After the move, the horizontal wraparound line is updated as shown, by moving up.

As shown in FIG. 16, when the virtual canvas is moved to the right by one column of memory units 102 e.g., as the virtual origin 404 approaches the right edge), the second-to-left-most column of memory units 102 (indicated by the bolded vertical wraparound line) of the virtual canvas is vacated and filled with the part of the image adjacent to that indicated by the bolded vertical wraparound line. After the move, the vertical wraparound line is updated as shown, by moving right.

As shown in FIG. 17, at this point, the virtual canvas has moved 3 rows of memory units 102 up and 2 columns of memory units 102 right, meaning that all memory cells in the cache 100 (except those in the shaded region shown below, delineated by the bolded wraparound lines) have been updated.

In this example, the direction of the update or refresh process follows the virtual origin 404 of the operand region 402, and can reverse direction at any time based on the movement of that virtual origin 404. In some instances, an image processing algorithm may need to access a substantially different part of the image, and may need to re-initialize cache 100 entirely rather than only update a small number of rows or columns of memory units 102.

Figure 5A:
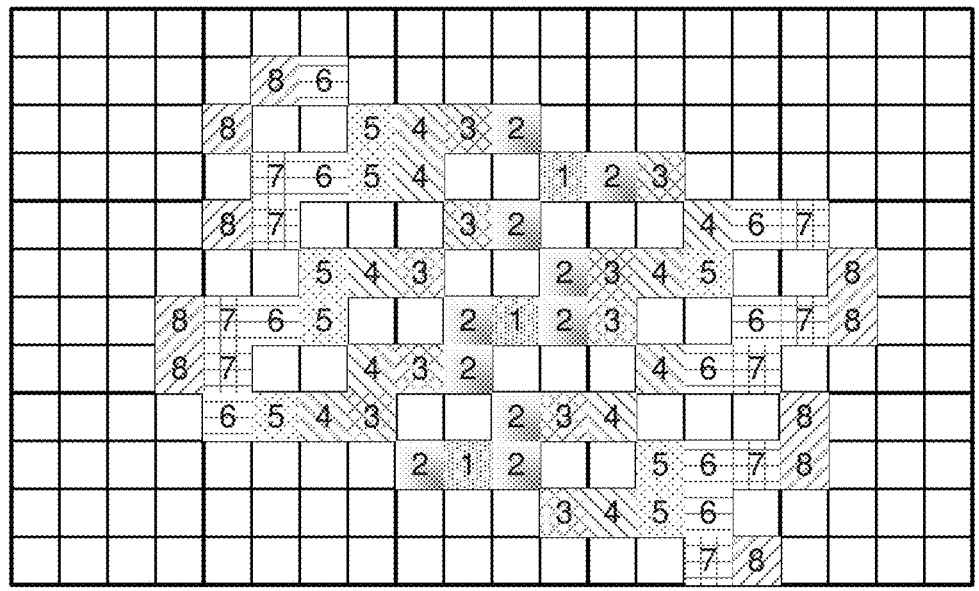
FIGS. 5A-5B illustrate physical and virtual addressing according to an embodiment.
Figure 5B:
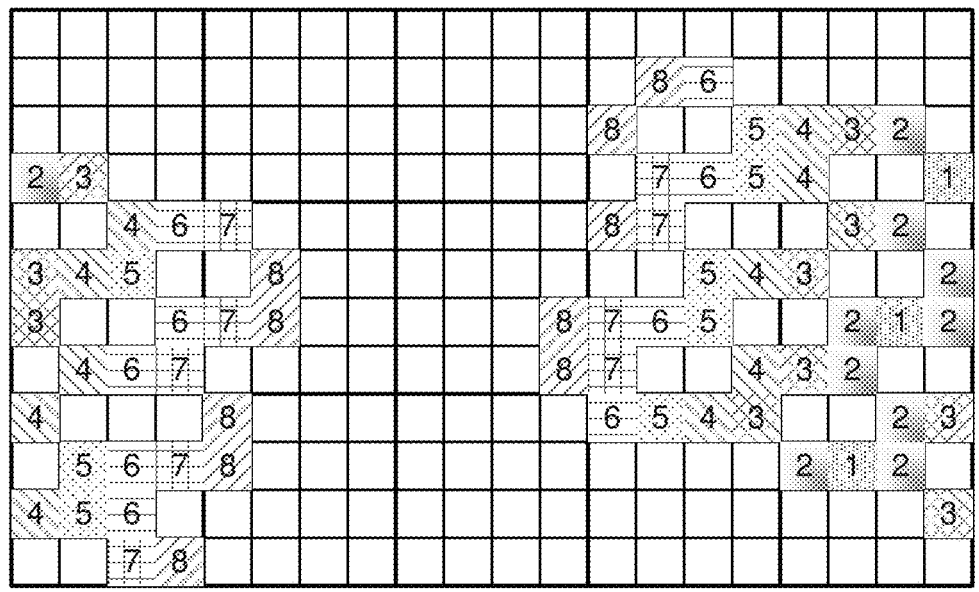

Although the physical address of a given byte in the cache 100 (expressible in 10 bits in this example) is in some aspects easier to perform address arithmetic on than the virtual address (expressible in 16 bits in this example), in most applications it is helpful to operate on the virtual addresses. This can be illustrated by comparing FIGS. 5A and 5B. FIG. 5A illustrates a pixel field where an image analysis algorithm has labeled groups (numbered "1" to "8"). The image in FIG. 5A represents the virtual address view of the image data in cache 100, regardless of how the virtual origin 404 has moved. On the other hand, after refreshing two times due to the right-most column of memory units 102 being replaced, the physical address view of the image data in cache 100 may look like FIG. 5B. That is, the virtual addresses show the image data in its original spatial arrangement, while the physical addresses may be shifted or fragmented.

Although the virtual addresses are 3 bits wider in this example (8 bits vs. 5 bits in both x and y addressing) than the physical addresses, virtual address arithmetic is guaranteed to remain within the bounds of the virtual canvas, with a simple table lookup association at the end to map virtual addresses to physical addresses.

As described herein, the cache 100 permits parallel accesses to the "X" and "Y" ports, allowing reading of near arbitrary patterns of memory cells. It some embodiments, it can be useful for the image processing algorithm to signal the pattern of memory cells it wishes to access by using an address template. The address template is a compact representation of a number of memory cells from which to read. In the current example, anywhere from one to eight memory cells (bytes) may be signaled in a given address template. A control and decode circuit (such as control and decode circuit 903 shown in FIG. 9) can process the address template to perform the read operation on cache 100 and populate a data vector with the contents of the memory cells such that a processing element may operate on the vector. The control and decode circuit may do this, for example, by sending appropriate read control signals to cache 100 (utilizing the row and/or column addressing units), after decoding the address template. The control and decode circuit may further populate a data vector from the results of that read, for example by concatenating the different bytes together.

The address template may take a number of different forms. In some embodiments, an address template may be described as follows, where there are two basic types, either a pseudo-linear type or a linear type:

Psuedo-linear type template

| Field | Description |
| --- | --- |
| [3:0] | Template type (=0) |
| [4] | Default read port |
| [9:5] | Δx to 1st byte |
| [14:10] | Δy to 1st byte |
| [17:15] | Δx, Δy to 2nd byte |
| [20:18] | Δx, Δy to 3rd byte |
| [23:21] | Δx, Δy to 4th byte |
| [26:24] | Δx, Δy to 5th byte |
| [29:27] | Δx, Δy to 6th byte |
| [32:30] | Δx, Δy to 7th byte |
| [35:33] | Δx, Δy to 8th byte |

Linear type template

| Field | Description |
| --- | --- |
| [3:0] | Template type (=1) |
| [4] | Default read port |
| [9:5] | Δx to 1st byte |
| [14:10] | Δy to 1st byte |
| [16:15] | Δx to 2nd byte |
| [18:17] | Δx to 3rd byte |
| [20:19] | Δx to 4th byte |
| [22:21] | Δx to 5th byte |
| [24:23] | Δx to 6th byte |
| [26:25] | Δx to 7th byte |
| [28:27] | Δx to 8th byte |

For each of the pseudo-linear and linear type templates, the first three bits of the structure ([3:0]) represent the type of template. For pseudo-linear types, the type is 0, and for linear types, the type is 1. As shown, there are three bits to represent the type for flexibility in adding more types; where there are only two types as shown, a single bit is sufficient to represent the type. Also for each of the pseudo-linear and linear type templates, the next bit [4] specifies the default read port ("X" port=0 or "Y" port=1), and the following ten bits specifies the signed offset ([9:5] for the x-offset and [14:10] for the y-offset) from the origin 404 to the first byte to be read. After this, the format of the two types of templates differs.

For pseudo-linear type templates, the offsets specifying x- and y-offsets are provided as three bit fields ([17:15], [20:18], [23:21], [26:24], [29:27], [32:30], and [35:33]). In embodiments, the template may include any number of bytes to be read, such as anywhere from 1 byte to 8 bytes. For a given operation, the vector length may be specified by the processing element. The significance of the three bits for the offset may, in some embodiments, be described as follows:

| Δx, Δy [2:0] | Description |
| --- | --- |
| 000 | Δx = 1, Δy = 0 |
| 001 | Δx = 0, Δy = 1 |
| 010 | Δx = 1, Δy = 1 |
| 011 | Δx = 2, Δy = 0 |
| 100 | Δx = 0, Δy = 2 |
| 101 | Δx = 2, Δy = 1 |
| 110 | Δx = 1, Δy = 2 |
| 111 | Δx = 2, Δy = 2 |

The pseudo-linear type template forms an approximately-linear pattern (e.g., at an angle or arc) where the x- and y-offsets do not reverse direction.

For linear type templates, the offsets specifying x-offsets are provided as two-bit fields ([16:15], [18:17], [20:19], [22:21], [24:23], [26:25], and [28:27]). In embodiments, the template may include any number of bytes to be read, such as anywhere from 1 byte to 8 bytes. For a given operation, the vector length may be specified by the processing element. Linear type templates form a line, either horizontal or vertical, with the bytes packed or spaced apart. The linear type template can be specified using the pseudo-linear type template and only indicating offsets in one of the x- or y-offset (the other offset being 0). The advantage to the linear type template is that it can be specified more compactly.

In addition to the templates above, a reflection control structure may also be used. For example, an application may set the reflection control once to apply to a sequence of read operations using the address templates. The reflection control may look like:

| Field | Description |
| --- | --- |
| [0] | Polarity of 1st Δx |
| [1] | Polarity of 1st Δy |
| [2] | Polarity of remaining Δx |
| [3] | Polarity of remaining Δy |
| [4] | Exchange x and y |

As described above, the default read port is the "X" port when bit [4] of the address template is 0 and is the "Y" port when bit [4] of the address template is 1. Using the reflection control can change that behavior; for example, if bit [4] of the reflection control is 1, then the default read port for any given template is swapped, and if bit [4] of the reflection control is 0, then the default read port for any given template retains its normal behavior.

Reflection control may be implemented as a programmable register. When the control and decode circuit operates on an address template to perform a read operation, the reflection control may indicate the polarity (signs) of the Δx and Δy for the first byte of the read operation, and the polarity (signs) of the Δx and Δy for the remaining bytes of the read operation. The reflection control may also indicate that the "X" and "Y" ports are swapped (bit [4]). This can have the effect, for example, of rotating the read pattern by 90°.

Figure 6A:
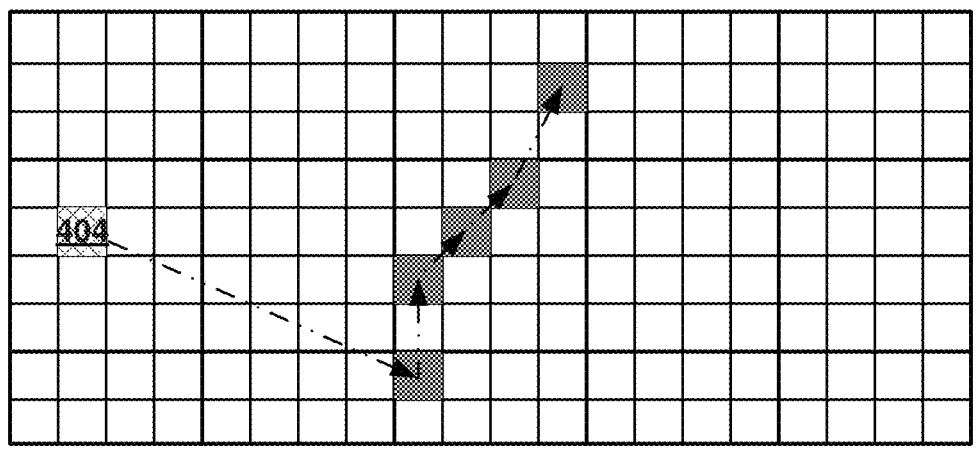
FIGS. 6A-6D illustrate address templates according to an embodiment.
Figure 6B:
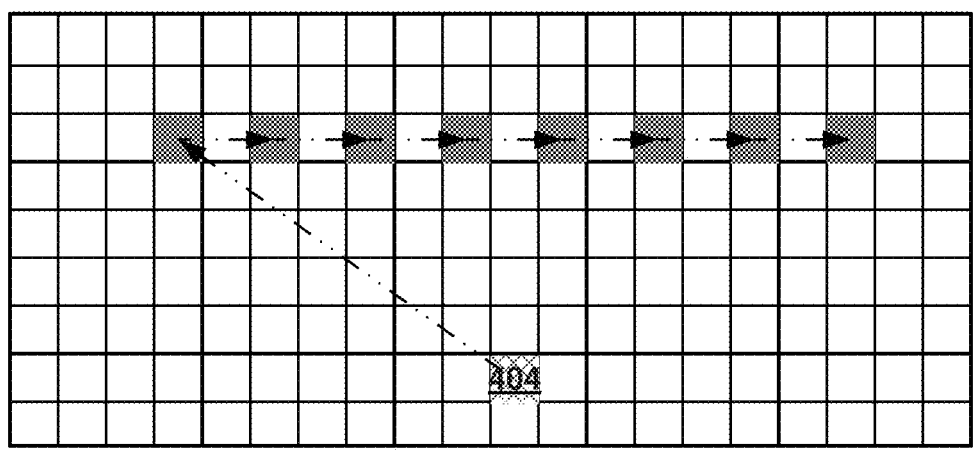

FIGS. 6A-6D illustrate examples of address templates used to facilitate certain read patterns. For example, FIG. 6A shows an example of a pseudo-linear type template. This is a pattern that may be used by some parts of the image analysis algorithm. The initial memory cell (byte) to be read is given from a reference origin 404 in this example. This may be reflected as an (x,y) offset of (7,3). The next memory cell (byte) to be read is given as an (x,y) offset from the first byte, the offset here being (0,2). Likewise, each successive memory cell (byte) to be read is given as an (x,y) offset from the previous byte, the offsets here being (1,1), (1,1), and (1,2). Similarly, FIG. 6B shows an example of a linear type template. The initial memory cell (byte) to be read is given from a reference origin 404 in this example. This may be reflected as an (x,y) offset of (−7,5). Subsequent memory cells (bytes) to be read are given as x-offsets of the preceding byte read, which here are 2, 2, 2, 2, 2, 2, 2.

Figure 6C:
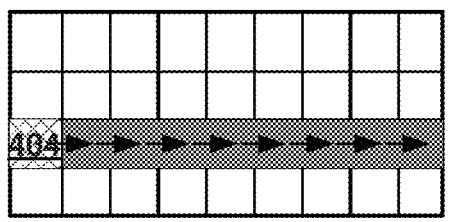
Figure 6D:
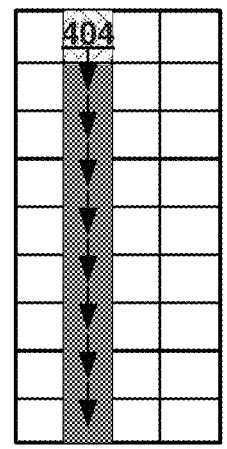
Figure 7A:
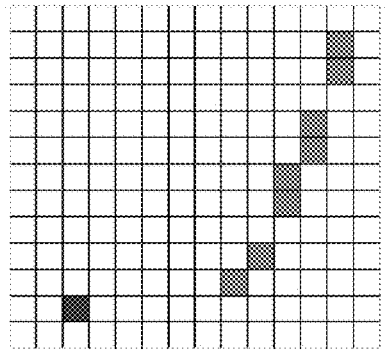
FIGS. 7A-7H illustrate address templates according to an embodiment.
Figure 7B:
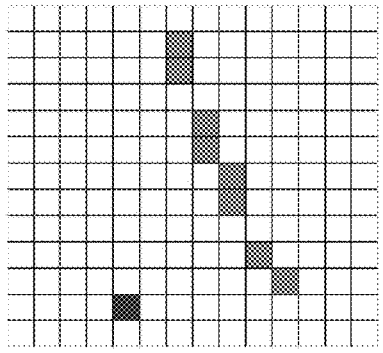
Figure 7C:
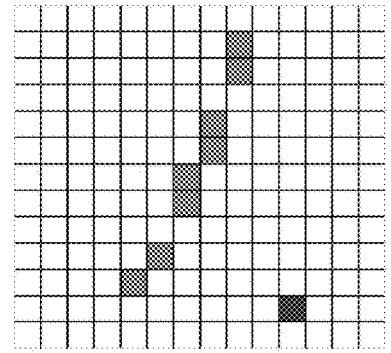
Figure 7D:
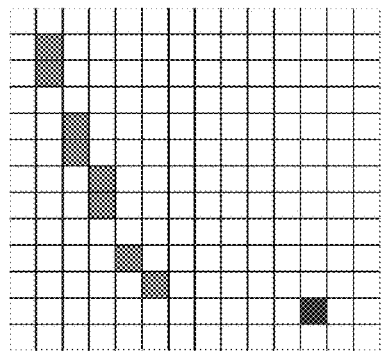
Figure 7E:
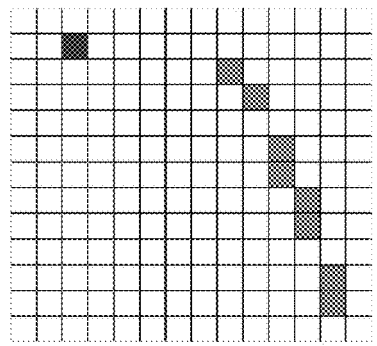
Figure 7F:
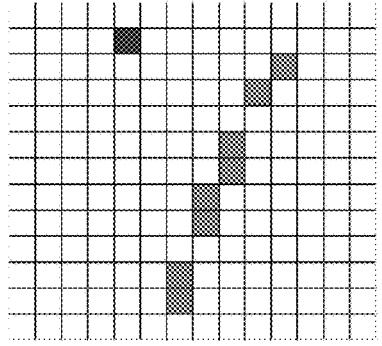
Figure 7G:
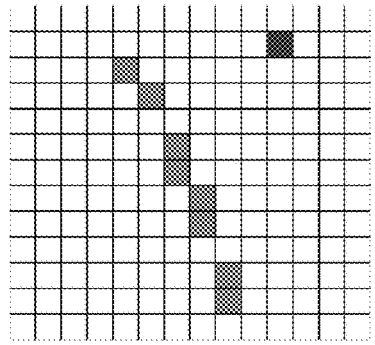
Figure 7H:
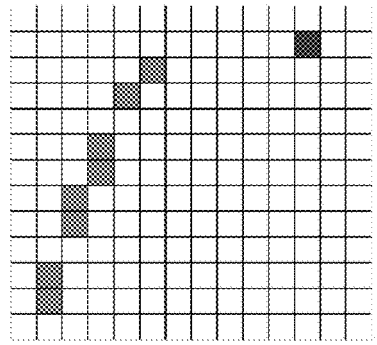

Similarly, FIGS. 6C and 6D show examples of linear type templates. In. FIG. 6C, the initial memory cell (byte) to be read is given as an (x,y) offset from the origin 404 of (1,0), and each successive memory cell (byte) to be read is given with an x-offset of 1, 1, 1, 1, 1, 1, 1. In FIG. 6D, the initial memory cell (byte) to be read is given as an (x,y) offset from the origin 404 of (0,−1), and each successive memory cell (byte) to be read is given with a y-offset of −1, −1, −1, −1, −1, −1, −1. The template of FIG. 6D can also be derived from the template of FIG. 6C by using reflection control.

FIGS. 7A-7H illustrate examples of address templates used to facilitate certain read patterns. In particular, FIGS. 7A-7H each show the same pseudo-linear type template, but with different values for sign reversal for x- and y-offsets using reflection control. For example, reversing polarity of Δx or Δy to the first byte reflects about the origin. Reversing polarity of Δx or Δy to subsequent bytes reflects about the 1$^{st}$ byte. By reversing the definitions of x and y, this same template yields eight more configurations that are equivalent to those shown in FIGS. 7A-7H but rotated by 90 degrees.

As can be seen, by using reflection control, the amount of template reuse that is possible dramatically reduces the quantity of templates that must be stored in local memory (e.g., SRAM) by the processing element.

Figure 8:
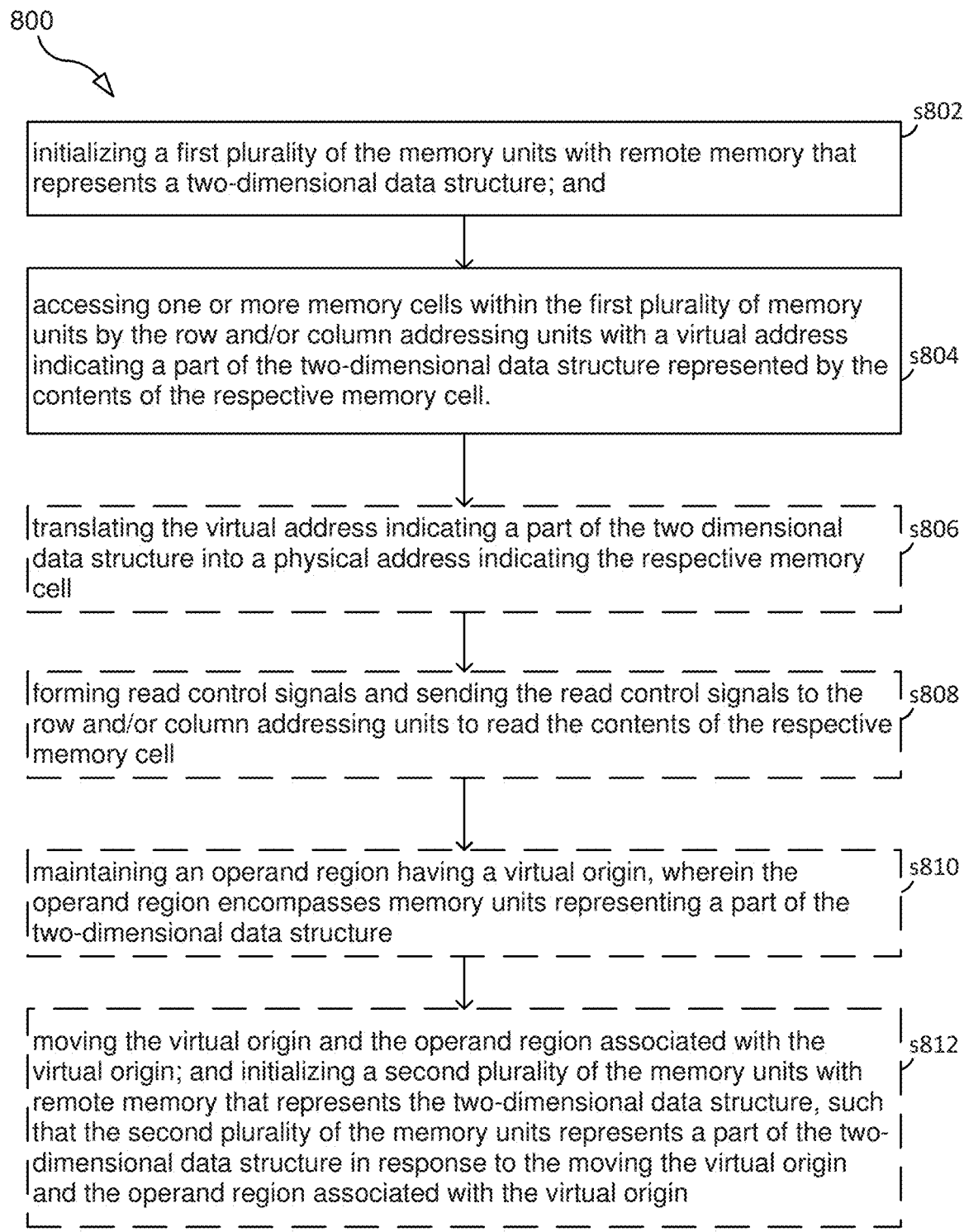
FIG. 8 is a flow chart illustrating a process according to an embodiment.

FIG. 8 illustrates a flow chart according to an embodiment. Process 800 is a method of accessing a cache according to any one of the embodiments disclosed herein. The method may begin with step s802.

Step s802 comprises initializing a first plurality of the memory units with remote memory that represents a two-dimensional data structure.

Step s804 comprises accessing one or more memory cells within the first plurality of memory units by the row and/or column addressing units with a virtual address indicating a part of the two-dimensional data structure represented by the contents of the respective memory cell.

In some embodiments, the method further includes translating the virtual address indicating a part of the two dimensional data structure into a physical address indicating the respective memory cell (step s806). In some embodiments, the method further includes forming read control signals and sending the read control signals to the row and/or column addressing units to read the contents of the respective memory cell (step s808).

In some embodiments, accessing one or more memory cells within the first plurality of memory units by the row and/or column addressing units with a virtual address indicating a part of the two-dimensional data structure represented by the contents of the respective memory cell comprises: decoding an address template having a plurality of virtual addresses; and forming an operand vector with the contents of memory cells corresponding to each of the plurality of virtual addresses.

In some embodiments, the method further includes maintaining an operand region having a virtual origin, wherein the operand region encompasses memory units representing a part of the two-dimensional data structure (step s810). In some embodiments, the method further includes moving the virtual origin and the operand region associated with the virtual origin; and initializing a second plurality of the memory units with remote memory that represents the two-dimensional data structure, such that the second plurality of the memory units represents a part of the two-dimensional data structure in response to the moving the virtual origin and the operand region associated with the virtual origin (step s812).

In some embodiments, initializing a second plurality of the memory units with remote memory that represents the two-dimensional data structure, such that the second plurality of the memory units represents a part of the two-dimensional data structure in response to the moving the virtual origin and the operand region associated with the virtual origin comprises one of: (1) replacing a previous left-most column of memory units with a new right-most column of memory units and reassigning the virtual address of the new column as the sum of the virtual address of the previous right-most column plus the width of a single memory unit, in response to moving the virtual origin and the operand region associated with the virtual origin to the right; (2) replacing a previous right-most column of memory units with a new left-most column of memory units and reassigning the virtual address of the new column as the difference between the virtual address of the previous right-most column minus the width of a single memory unit, in response to moving the virtual origin and the operand region associated with the virtual origin to the left; (3) replacing a previous bottom-most row of memory units with a new top-most row of memory units and reassigning the virtual address of the new row as the sum of the virtual address of the previous top-most row plus the height of a single memory unit, in response to moving the virtual origin and the operand region associated with the virtual origin up; and (4) replacing a previous top-most row of memory units with a new bottom-most row of memory units and reassigning the virtual address of the new row as the difference between the virtual address of the previous bottom-most row minus the height of a single memory unit, in response to moving the virtual origin and the operand region associated with the virtual origin down.

In some embodiments, only a subset of the array of memory units is used to store data corresponding to the two-dimensional data structure as part of processing the two-dimensional data structure, and the remaining part of the array of memory units is used for scratchpad space. In some embodiments, the two-dimensional data structure comprises image data. In some embodiments, the two-dimensional data structure comprises a matrix.

In some embodiments, cache 100 may be implemented in a larger system, such as in an apparatus 900. Cache 100 and/or apparatus 900 may be part of, or configured to operate with, one or more of a general purpose computer, a CPU, a graphics processing unit (GPU), an application-specific integrated circuit (ASIC), a field-programmable gate array (FPGA), or any other type of computer hardware component. The term "cache" may be used to refer only to cache 100, or by extension may refer to apparatus 900 that includes cache 100, depending on the context in which it is used.

Figure 9:
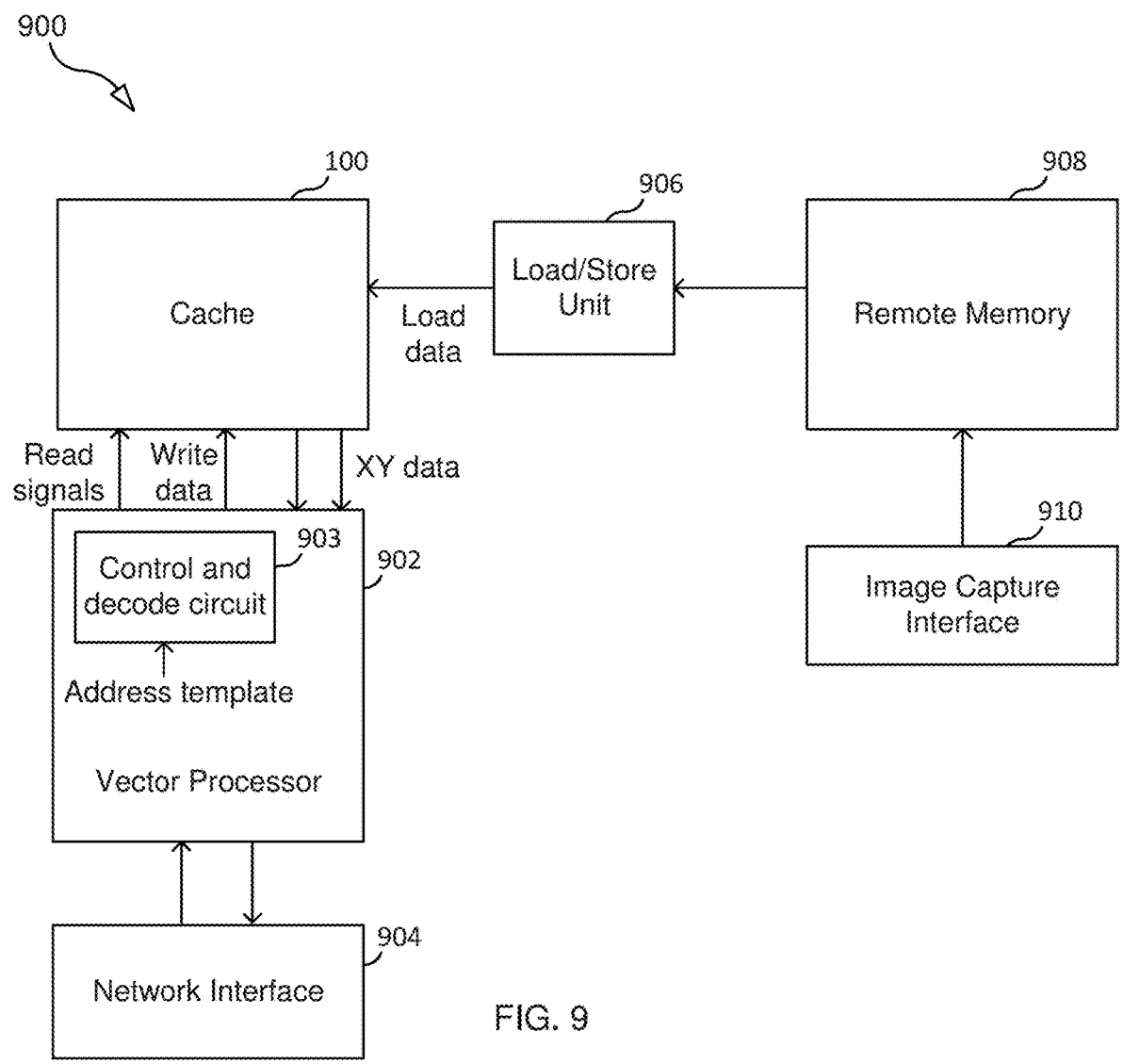
FIG. 9 is a block diagram of an apparatus according to an embodiment.

FIG. 9 is a block diagram of an apparatus 900, according to some embodiments. As shown in FIG. 9, apparatus 900 may comprise: a cache 100, a vector processor 902, a network interface 904, a load/store unit 906, a remote memory 908, and an image capture interface 910. Vector processor 902 may communicate with cache 100, for example, by read or write data to cache 100. Vector processor 902, or similar parallel processing entity, may utilize an address template to send a read instruction to cache 100, and cache 100 may then in response send the results (e.g., one or more operands) to vector processor 902. For example, vector processor 902 may include a control and decode circuit 903 (shown as part of vector processor 902, but it may also be separate from vector processor 902). The control and decode circuit 903 processes an address template by decoding the address template and forming the appropriate read control signal to send to cache 100, so that an operand vector having each of the operands specified in the address template is formed and provided to the vector processor 902. As shown, the address template may be an input to the control and decode circuit (e.g., received from the vector processor 902). Vector processor 902 may also use physical addresses to read from cache 100, such as when accessing data from scratchpad space separate from the virtual canvas in cache 100. In addition to reading, vector processor 902 may also write to cache 100, such as by writing to the scratchpad space or virtual canvas. Such writing may include intermediate data, or may include writing the results of performing a vector operation or other processing on the one or more operands that were read from cache 100. Although not shown, vector processor 902 may also be coupled to other components of apparatus 900, including other types of cache (e.g., L1 or L2 cache), register files, buses, or peripherals. Vector processor 902 may communicate with other components or systems (including other components of apparatus 900 or components not part of apparatus 900) via network interface 904.

Load/store unit 906 is coupled to cache 100, and may be used to fill or populate the contents of cache 100. For example, load/store unit 906 may access remote memory 908 (such as image memory), to fill or populate the contents of cache 100. Remote memory 908 may be any type of memory, and may be coupled to other components, such as to image capture interface 910 which may capture images and store them digitally to remote memory 908. In the context of a vector processor, load/store unit 906 is sometimes referred to as a load/store vector. Load/store unit 906 is responsible for executing load and store instructions.

CONCISE DESCRIPTION OF VARIOUS EMBODIMENTS

A1. A cache comprising:
a p (rows)×q (columns) array of memory units;
a row addressing unit; and
a column addressing unit;
wherein each memory unit has an m (rows)×n (columns) array of memory cells;
wherein the column addressing unit has, for each memory unit, m n-to-one multiplexers, one associated with each of the m rows of the memory unit, wherein each n-to-one multiplexer has an input coupled to each of the n memory cells associated with the row associated with that multiplexer;

wherein the row addressing unit has, for each memory unit, n m-to-one multiplexers, one associated with each of the n columns of the memory unit, wherein each m-to-one multiplexer has an input coupled to each of the m memory cells associated with the column associated with that multiplexer, and wherein the row addressing unit and column addressing unit support reading and/or writing of the array of memory units, such that multiple rows and/or columns of the array of memory units may be read and/or written in parallel.

A2. The cache of embodiment A1, wherein m=n=4 and each memory cell comprises one byte, such that each memory unit comprises 16 bytes, and wherein p=q=8, such that the array of memory units comprises 1024 bytes.

A3. The cache of any one of embodiments A1-A2, wherein the row addressing unit and column addressing unit support reading and/or writing to multiple rows and/or columns of the memory cells of one or more of the memory units in a single clock cycle.

A4. The cache of any one of embodiments A1-A3, wherein the row addressing unit is able to address up to p*m rows of memory cells across one or more of the array of memory units and read any cell in each of the p*m rows, where no two such cells are in the same row.

A5. The cache of any one of embodiments A1-A4, wherein the column addressing unit is able to address up to q*n columns of memory cells across one or more of the array of memory units and read any cell in each of the q*n columns, where no two such cells are in the same column.

A6. The cache of any one of embodiments A1-A5, wherein:
the row addressing unit further has, for each memory unit not in the first row of the array of memory units, a two-to-one multiplexer having an input coupled to an output of the n-to-one multiplexer associated with each column of the memory unit and an output of the n-to-one multiplexer associated with the memory unit in the preceding row, and
the column addressing unit further has, for each memory unit not in the first column of the array of memory units, a two-to-one multiplexer having an input coupled to an output of the m-to-one multiplexer associated with each row of the memory unit and an output of the m-to-one multiplexer associated with the memory unit in the preceding column.

A7. The cache of any one of embodiments A1-A6, wherein the row addressing unit and the column addressing unit each support reading of the memory cells of the array of memory units, and wherein the row addressing unit supports writing of the memory cells of the array of memory units.

A8. The cache of embodiment A7, wherein only the row addressing unit supports writing of the memory cells of the array of memory units, such that the column addressing unit does not support writing of the memory cells of the array of memory units.

A9. The cache of any one of embodiments A1-A8, wherein a memory unit in the p×q array of memory units represents the minimum entity that may be represented by a virtual address.

A10. The cache of any one of embodiments A1-A9, such that for each memory unit in the p×q array of memory units, each memory cell within the memory unit is the smallest addressable quantum of data in the cache and has only a physical address within the memory unit.

A11. The cache of any one of embodiments A1-A10, wherein the row addressing unit has separate addresses for each of the q*n columns and the column addressing unit has separate addresses for each of the p*m rows, such that the row and column addressing units support concurrently reading and/or writing up to p*m memory cells from different rows and up to q*n memory cells from different columns within the array of memory units and the array of memory cells within each memory unit.

A12. The cache of any one of embodiments A1-A11, further comprising a load/store unit capable of filling some or all of the memory cells with remote memory that represents a two-dimensional data structure, and a control and decode circuit capable of translating a virtual address representing a part of the two-dimensional data structure represented by remote memory to control signals for directing the row and column addressing units to access particular memory cells.

A13. The cache of embodiment A12, wherein the control and decode circuit maintains an operand region having a virtual origin, such that the virtual origin serves as a reference point for an address template comprising a plurality of virtual addresses for the remote memory and wherein the control and decode circuit is further capable of decoding the address template to determine the plurality of virtual addresses.

A14. The cache of embodiment A13, wherein the control and decode circuit is further capable of manipulating the virtual origin and instructing a load/store unit to initialize and/or update memory cells by reading data from the remote memory as the virtual origin is manipulated.

B1. A method of accessing a cache according to any one of embodiments A1-A14, the method comprising:
initializing a first plurality of the memory units with remote memory that represents a two-dimensional data structure; and
accessing one or more memory cells within the first plurality of memory units by the row and/or column addressing units with a virtual address indicating a part of the two-dimensional data structure represented by the contents of the respective memory cell.

B2. The method of embodiment B1, further comprising translating the virtual address indicating a part of the two dimensional data structure into a physical address indicating the respective memory cell.

B3. The method of embodiment B2, further comprising forming read control signals and sending the read control signals to the row and/or column addressing units to read the contents of the respective memory cell.

B4. The method of any one of embodiments B1-B3, wherein accessing one or more memory cells within the first plurality of memory units by the row and/or column addressing units with a virtual address indicating a part of the two-dimensional data structure represented by the contents of the respective memory cell comprises:
decoding an address template having a plurality of virtual addresses; and
forming an operand vector with the contents of memory cells corresponding to each of the plurality of virtual addresses.

B5. The method of any one of embodiments B1-B4, further comprising:
maintaining an operand region having a virtual origin, wherein the operand region encompasses memory units representing a part of the two-dimensional data structure.

B6. The method of embodiment B5, further comprising:
moving the virtual origin and the operand region associated with the virtual origin; and
initializing a second plurality of the memory units with remote memory that represents the two-dimensional data structure, such that the second plurality of the memory units represents a part of the two-dimensional data structure in response to the moving the virtual origin and the operand region associated with the virtual origin.

B7. The method of any one of embodiment B6, wherein initializing a second plurality of the memory units with remote memory that represents the two-dimensional data structure, such that the second plurality of the memory units represents a part of the two-dimensional data structure in response to the moving the virtual origin and the operand region associated with the virtual origin comprises one of:

(1) replacing a previous left-most column of memory units with a new right-most column of memory units and reassigning the virtual address of the new column as the sum of the virtual address of the previous right-most column plus the width of a single memory unit, in response to moving the virtual origin and the operand region associated with the virtual origin to the right;

(2) replacing a previous right-most column of memory units with a new left-most column of memory units and reassigning the virtual address of the new column as the difference between the virtual address of the previous right-most column minus the width of a single memory unit, in response to moving the virtual origin and the operand region associated with the virtual origin to the left;

(3) replacing a previous bottom-most row of memory units with a new top-most row of memory units and reassigning the virtual address of the new row as the sum of the virtual address of the previous top-most row plus the height of a single memory unit, in response to moving the virtual origin and the operand region associated with the virtual origin up; and (4) replacing a previous top-most row of memory units with a new bottom-most row of memory units and reassigning the virtual address of the new row as the difference between the virtual address of the previous bottom-most row minus the height of a single memory unit, in response to moving the virtual origin and the operand region associated with the virtual origin down.

B8. The method of any one of embodiments B1-B7, wherein only a subset of the array of memory units is used to store data corresponding to the two-dimensional data structure as part of processing the two-dimensional data structure, and the remaining part of the array of memory units is used for scratchpad space.

B9. The method of any one of embodiments B1-B8, wherein the two-dimensional data structure comprises image data.

B10. The method of any one of embodiments B1-B8, wherein the two-dimensional data structure comprises a matrix.

C1. A computer program comprising instructions which when executed by processing circuitry causes the processing circuitry to perform the method of any one of embodiments B1-B10.

C2. A carrier containing the computer program of embodiment C1, wherein the carrier is one of an electronic signal, an optical signal, a radio signal, and a computer readable storage medium.

D1. An apparatus comprising the cache of any one of embodiments A1-A14, wherein the apparatus is one of a general purpose computer, a central processing unit (CPU), a graphics processing unit (GPU), an application-specific integrated circuit (ASIC), and a field-programmable gate array (FPGA).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A cache comprising:
   a p (rows)×q (columns) array of memory units;
   a row addressing unit; and
   a column addressing unit;
   wherein each memory unit has an m (rows)×n (columns) array of memory cells;
   wherein the column addressing unit has, for each memory unit, m n-to-one multiplexers, one associated with each of the m rows of the memory unit, wherein each n-to-one multiplexer has an input coupled to each of the n memory cells associated with the row associated with that multiplexer;
   wherein the row addressing unit has, for each memory unit, n m-to-one multiplexers, one associated with each of the n columns of the memory unit, wherein each m-to-one multiplexer has an input coupled to each of the m memory cells associated with the column associated with that multiplexer, and
   wherein the row addressing unit and column addressing unit support reading and/or writing of the array of memory units, such that multiple rows and/or multiple columns of the array of memory units may be read and/or written in parallel.

2. The cache of claim 1, wherein m=n=4 and each memory cell comprises one byte, such that each memory unit comprises 16 bytes, and wherein p=q=8, such that the array of memory units comprises 1024 bytes.

3. The cache of claim 1, wherein the row addressing unit and column addressing unit support reading and/or writing to multiple rows and/or multiple columns of the memory cells of one or more of the memory units in a single clock cycle.

4. The cache of claim 1, wherein the row addressing unit is able to address up to p*m rows of memory cells across one or more of the array of memory units and read any cell in each of the p*m rows, where no two such cells are in the same row.

5. The cache of claim 1, wherein the column addressing unit is able to address up to q*n columns of memory cells across one or more of the array of memory units and read any cell in each of the q*n columns, where no two such cells are in the same column.

6. The cache of claim 1, wherein:
   the row addressing unit further has, for each memory unit not in the first row of the array, of memory units, a two-to-one multiplexer having an input coupled to an output of the n-to-one multiplexer associated with each column of the memory unit and an output of the n-to-one multiplexer associated with the memory unit in the preceding row, and
   the column addressing unit further has, for each memory unit not in the first column of the array of memory units, a two-to-one multiplexer having an input coupled to an output of the m-to-one multiplexer associated with each row of the memory unit and an output of the m-to-one multiplexer associated with the memory unit in the preceding column.

7. The cache of claim 1, wherein the row addressing unit and the column addressing unit each support reading of the memory cells of the array of memory units, and wherein the row addressing unit supports writing of the memory cells of the array of memory units.

8. The cache of claim 7, wherein only the row addressing unit supports writing of the memory cells of the array of memory units, such that the column addressing unit does not support writing of the memory cells of the array of memory units.

9. The cache of claim 1, wherein a memory unit in the p×q array of memory units represents the minimum entity that may be represented by a virtual address.

10. The cache of claim 1, such that for each memory unit in the p×q array of memory units, each memory cell within the memory unit is the smallest addressable quantum of data in the cache and has only a physical address within the memory unit.

11. The cache of claim 1, wherein the row addressing unit has separate addresses for each of the q*n columns and the column addressing unit has separate addresses for each of the p*m rows, such that the row and column addressing units support concurrently reading and/or writing up to p*m memory cells from different rows and up to q*n memory cells from different columns within the array of memory units and the array of memory cells within each memory unit.

12. The cache of claim 1, further comprising a load/store unit capable of filling some or all of the memory cells with remote memory that represents a two-dimensional data structure, and a control and decode circuit capable of translating a virtual address representing a part of the two-dimensional data structure represented by remote memory to control signals for directing the row and column addressing units to access particular memory cells.

13. The cache of claim 12, wherein the control and decode circuit maintains an operand region having a virtual origin, such that the virtual origin serves as a reference point for an address template comprising a plurality of virtual addresses for the remote memory and wherein the control and decode circuit is further capable of decoding the address template to determine the plurality of virtual addresses.

14. The cache of claim 13, wherein the control and decode circuit is further capable of manipulating the virtual origin and instructing a load/store unit to initialize and/or update memory cells by reading data from the remote memory as the virtual origin is manipulated.

15. A method of accessing a cache according to ciaint 1, the method comprising:
   initializing a first piuraiity of the memory units with remote memory that represents a two-dimensional data structure, and
   accessing one or more memory cells within the first plurality of memory units by the row and/or column addressing units with a virtual address indicating a part of the two-dimensional data structure represented by the contents of the respective memory cell.

16. The method of cell 15, further comprising translating the virtual address indicating a part of the two dimensional data structure into a physical address indicating the respective memory cell.

17. The method of claim 16, further comprising forming read control signals and sending the read control signals to the row and/or column addressing units to read the contents of the respective memory cell.

18. The method of claim 15, wherein accessing one or more memory cells within the first plurality of memory units by the row and/or column addressing units with a virtual address indicating a part of the two-dimensional data structure represented by the contents of the respective memory cell comprises:
decoding an address template having a plurality of virtual addresses; and
forming an operand vector with the contents of memory cells corresponding to each of the plurality of virtual addresses.

19. The method of claim 15, further comprising:
maintaining an operand region having a virtual origin, wherein the operand region encompasses memory units representing a part of the two-dimensional data structure.

20. The method of claim 19, further comprising:
moving the virtual origin and the operand region associated with the virtual origin; and
initializing a second plurality of the memory units with remote memory that represents the two-dimensional data structure, such that the second plurality of the memory units represents a part of the two-dimensional data structure in response to the moving the virtual origin and the operand region associated with the virtual origin.

21. The method of claim 20, wherein initializing a second plurality of the memory units with remote memory that represents the two-dimensional data structure, such that the second plurality of the memory units represents a part of the two-dimensional data structure in response to the moving the virtual origin and the operand region associated with the virtual origin comprises one of:
(1) replacing a previous left-most column of memory units with a new right-most column of memory units and reassigning the virtual address of the new column as the sum of the virtual address of the previous right-most column plus the width of a single memory unit, in response to moving the virtual origin and the operand region associated with the virtual origin to the right;
(2) replacing a previous right-most column of memory units with a new left-most column of memory units and reassigning the virtual address of the new column as the difference between the virtual address of the previous right-most column minus the width of a single memory unit, in response to moving the virtual origin and the operand region associated with the virtual origin to the left;
(3) replacing a previous bottom-most row of memory units with a new top-most row of memory units and reassigning the virtual address of the new row as the sum of the virtual address of the previous top-most row plus the height of a single memory unit, in response to moving the virtual origin and the operand region associated with the virtual origin up; and
(4) replacing a previous top-most row of memory units with a new bottom-most row of memory units and reassigning the virtual address of the new row as the difference between the virtual address of the previous bottom-most row minus the height of a single memory unit, in response to moving the virtual origin and the operand region associated with the virtual origin down.

22. The method of claim 15, wherein only a subset of the array of memory units is used to store data corresponding to the two-dimensional data structure as part of processing the two-dimensional data structure, and the remaining part of the array of memory units is used for scratchpad space.

23. The method of claim 15, wherein the two-dimensional data structure comprises image data.

24. The method of claim 15, wherein the two-dimensional data structure comprises a matrix.

* * * * *